US012587925B2

(12) United States Patent
Ji et al.

(10) Patent No.: US 12,587,925 B2
(45) Date of Patent: Mar. 24, 2026

(54) EFFICIENT CONFIGURING OF A NON-TERRESTRIAL NETWORK CONNECTION

(71) Applicant: QUALCOMM Incorporated, San Diego, CA (US)

(72) Inventors: Lianghai Ji, San Diego, CA (US); Huilin Xu, Temecula, CA (US); Liangping Ma, San Diego, CA (US); Weimin Duan, San Diego, CA (US); Jun Ma, San Diego, CA (US); Mohamad Sayed Hassan, Paris (FR); Mehmet Izzet Gurelli, San Diego, CA (US); Qiang Wu, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 18/060,335

(22) Filed: Nov. 30, 2022

(65) Prior Publication Data

US 2024/0179591 A1      May 30, 2024

(51) Int. Cl.
*H04W 36/00*      (2009.01)
*H04W 36/08*      (2009.01)
*H04W 76/10*      (2018.01)
*H04W 84/06*      (2009.01)

(52) U.S. Cl.
CPC ........... *H04W 36/08* (2013.01); *H04W 76/10* (2018.02); *H04W 84/06* (2013.01)

(58) Field of Classification Search
CPC .................................................... H04W 84/06
See application file for complete search history.

(56) References Cited

U.S. PATENT DOCUMENTS

| | | | |
|---|---|---|---|
| 2020/0314914 A1 | 10/2020 | Roy et al. | |
| 2022/0070749 A1 | 3/2022 | Wang et al. | |
| 2023/0247506 A1* | 8/2023 | Xu | H04B 7/0621 370/331 |
| 2024/0121696 A1* | 4/2024 | Jassal | H04W 36/1446 |
| 2024/0276597 A1* | 8/2024 | Kim | H04W 76/11 |
| 2025/0119797 A1* | 4/2025 | Susitaival | H04W 36/0061 |
| 2025/0126537 A1* | 4/2025 | Wigard | H04W 36/083 |

FOREIGN PATENT DOCUMENTS

| | | | | |
|---|---|---|---|---|
| WO | WO-2021250632 A1 * | 12/2021 | ........ | H04B 7/18539 |
| WO | 2022153960 A1 | 7/2022 | | |
| WO | WO-2022155177 A1 * | 7/2022 | ........ | H04B 7/18504 |
| WO | WO-2023025389 A1 * | 3/2023 | ........... | H04B 7/1851 |

OTHER PUBLICATIONS

International Search Report and Written Opinion—PCT/US2023/036422—ISA/EPO—Feb. 19, 2024.

* cited by examiner

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a user equipment (UE) may communicate in a network based at least in part on using a first connection configuration. The UE may communicate in the network based at least in part using a second connection configuration instead of the first connection configuration. The UE may autonomously switch to reusing the first connection configuration for communicating in the network based at least in part on the first connection configuration being stored at the UE. Numerous other aspects are described.

30 Claims, 13 Drawing Sheets

Time = t₂

Time = t₁

Time = $t_4$

Time = $t_3$

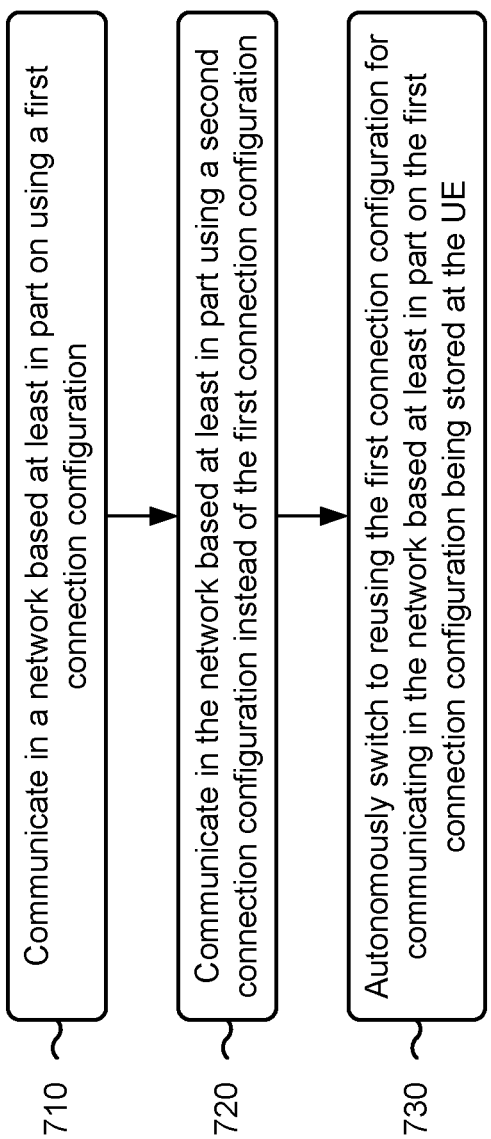

710 — Communicate in a network based at least in part on using a first connection configuration 720 — Communicate in the network based at least in part using a second connection configuration instead of the first connection configuration 730 — Autonomously switch to reusing the first connection configuration for communicating in the network based at least in part on the first connection configuration being stored at the UE

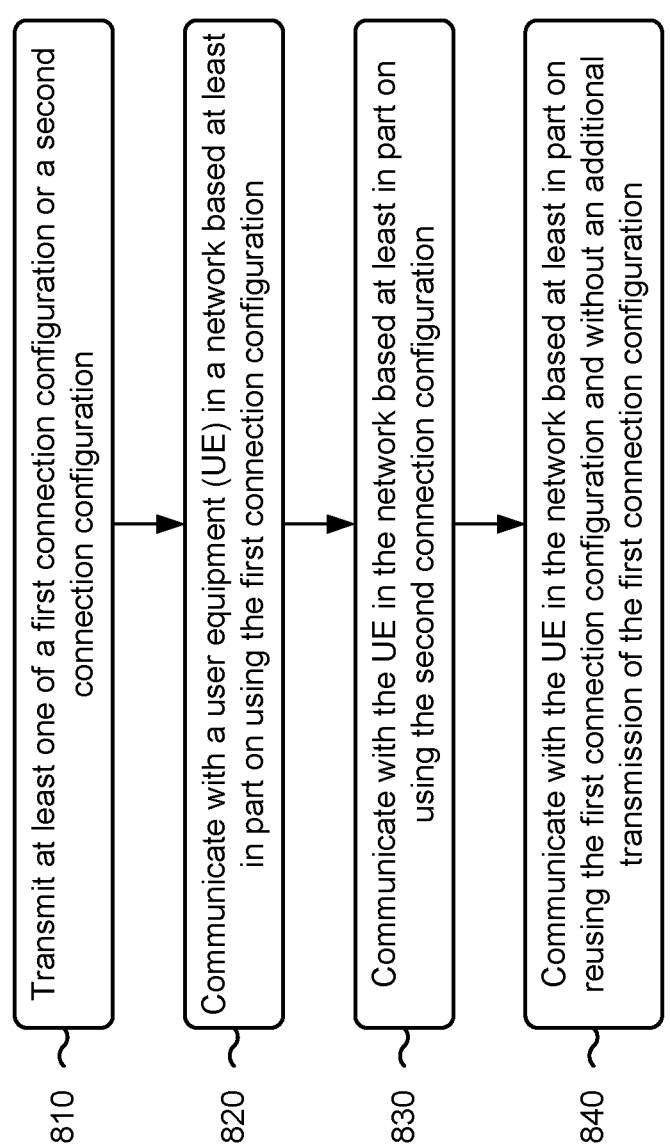

Transmit at least one of a first connection configuration or a second connection configuration

810

Communicate with a user equipment (UE) in a network based at least in part on using the first connection configuration

820

Communicate with the UE in the network based at least in part on using the second connection configuration

830

Communicate with the UE in the network based at least in part on reusing the first connection configuration and without an additional transmission of the first connection configuration

EFFICIENT CONFIGURING OF A NON-TERRESTRIAL NETWORK CONNECTION

FIELD OF THE DISCLOSURE

Aspects of the present disclosure generally relate to wireless communication and to techniques and apparatuses for efficient configuration of a non-terrestrial network connection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include communicating in a network based at least in part on using a first connection configuration. The method may include communicating in the network based at least in part using a second connection configuration instead of the first connection configuration. The method may include autonomously switching to reusing the first connection configuration for communicating in the network based at least in part on the first connection configuration being stored at the UE.

Some aspects described herein relate to a method of wireless communication performed by a network node. The method may include transmitting at least one of a first connection configuration or a second connection configuration. The method may include communicating with a UE in a network based at least in part on using the first connection configuration. The method may include communicating with the UE in the network based at least in part on using the second connection configuration. The method may include communicating with the UE in the network based at least in part on reusing the first connection configuration and without an additional transmission of the first connection configuration.

Some aspects described herein relate to an apparatus for wireless communication at a UE. The apparatus may include a memory and one or more processors coupled to the memory. The one or more processors may be configured to communicate in a network based at least in part on using a first connection configuration. The one or more processors may be configured to communicate in the network based at least in part using a second connection configuration instead of the first connection configuration. The one or more processors may be configured to autonomously switch to reusing the first connection configuration for communicating in the network based at least in part on the first connection configuration being stored at the UE.

Some aspects described herein relate to an apparatus for wireless communication at a network node. The apparatus may include a memory and one or more processors coupled to the memory. The one or more processors may be configured to transmit at least one of a first connection configuration or a second connection configuration. The one or more processors may be configured to communicate with a UE in a network based at least in part on using the first connection configuration. The one or more processors may be configured to communicate with the UE in the network based at least in part on using the second connection configuration. The one or more processors may be configured to communicate with the UE in the network based at least in part on reusing the first connection configuration and without an additional transmission of the first connection configuration.

Some aspects described herein relate to a non-transitory computer-readable medium that stores a set of instructions for wireless communication by a UE. The set of instructions, when executed by one or more processors of the UE, may cause the UE to communicate in a network based at least in part on using a first connection configuration. The set of instructions, when executed by one or more processors of the UE, may cause the UE to communicate in the network based at least in part using a second connection configuration instead of the first connection configuration. The set of instructions, when executed by one or more processors of the UE, may cause the UE to autonomously switch to reusing the first connection configuration for communicating in the network based at least in part on the first connection configuration being stored at the UE.

Some aspects described herein relate to a non-transitory computer-readable medium that stores a set of instructions for wireless communication by a network node. The set of instructions, when executed by one or more processors of the network node, may cause the network node to transmit at least one of a first connection configuration or a second connection configuration. The set of instructions, when executed by one or more processors of the network node, may cause the network node to communicate with a UE in a network based at least in part on using the first connection configuration. The set of instructions, when executed by one or more processors of the network node, may cause the network node to communicate with the UE in the network based at least in part on using the second connection configuration. The set of instructions, when executed by one or more processors of the network node, may cause the network node to communicate with the UE in the network based at least in part on reusing the first connection configuration and without an additional transmission of the first connection configuration.

Some aspects described herein relate to an apparatus for wireless communication. The apparatus may include means for communicating in a network based at least in part on using a first connection configuration. The apparatus may include means for communicating in the network based at least in part using a second connection configuration instead of the first connection configuration. The apparatus may include means for autonomously switching to reusing the first connection configuration for communicating in the network based at least in part on the first connection configuration being stored at the UE.

Some aspects described herein relate to an apparatus for wireless communication. The apparatus may include means for transmitting at least one of a first connection configuration or a second connection configuration. The apparatus may include means for communicating with a UE in a network based at least in part on using the first connection configuration. The apparatus may include means for communicating with the UE in the network based at least in part on using the second connection configuration. The apparatus may include means for communicating with the UE in the network based at least in part on reusing the first connection configuration and without an additional transmission of the first connection configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
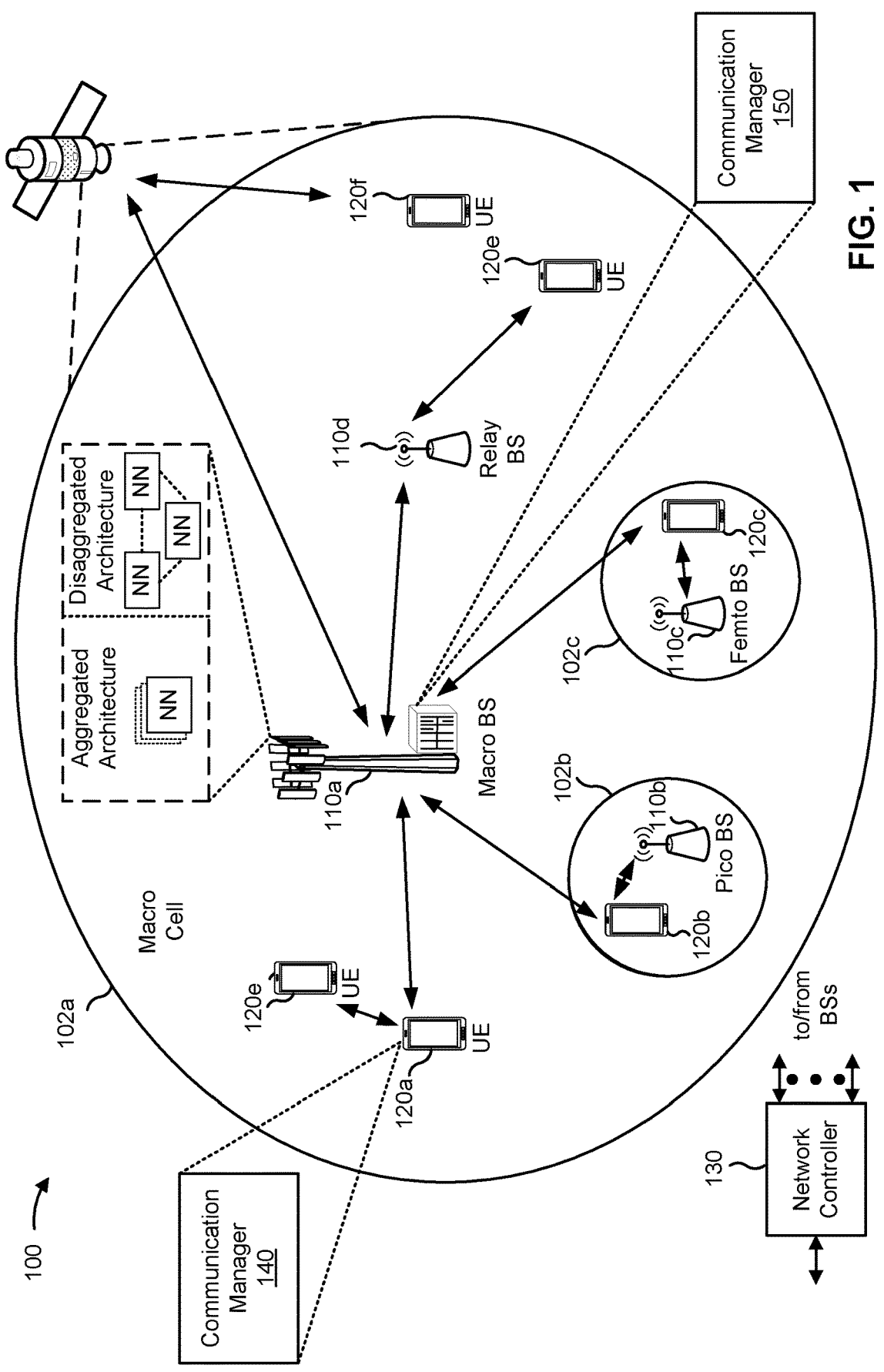
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

In some examples, and as shown by FIG. 1, a cell may be provided by the non-terrestrial network node 110b of a non-terrestrial network (NTN). The non-terrestrial network node 110b may also be referred to as a non-terrestrial base station or a non-terrestrial access point. "NTN" may denote a network that may be accessed based at least in part on a non-terrestrial network node (e.g., the non-terrestrial network node 110b). In some NTN deployments, the non-terrestrial network node 110b may be located on an airborne platform or a platform in orbit. Examples of such platforms include a satellite (e.g., a low earth orbit (LEO) satellite, a medium earth orbit (MEO) satellite, and/or a geostationary orbit (GEO) satellite), a balloon, a dirigible, an airplane, an unmanned aerial vehicle (UAV), and/or a drone.

Alternatively or additionally, in some NTN deployments (e.g., a transparent architecture or a bent pipe architecture), the non-terrestrial network node 110b may act as a relay station to relay communications between a UE 120 and the terrestrial network node 110a (e.g., a terrestrial base station located on the ground or on a tower). In this case, the non-terrestrial network node 110b may perform frequency translation and/or radio frequency amplification for communications relayed between the UE 120 and the terrestrial network node 110a. For example, the UE 120 may transmit an uplink communication to the non-terrestrial network node 110b, which may relay the uplink communication to the terrestrial network node 110a (e.g., after performing frequency translation and/or radio frequency amplification). The terrestrial network node 110a may perform additional processing on the uplink communication and/or may transmit the uplink communication to a core network. As another example, the terrestrial network node 110a may transmit a downlink communication to the non-terrestrial network node 110b, which may relay the downlink communication to the UE 120 (e.g., after performing frequency translation and/or radio frequency amplification). In some aspects, a UE 120 and/or the terrestrial network node 110a may be referred to as a ground station (GS).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network

100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, UE (e.g., the UE 120) may include a communication manager 140. As described in more detail elsewhere herein, the communication manager 140 may communicate in a network based at least in part on using a first connection configuration; communicate in the network based at least in part using a second connection configuration instead of the first connection configuration; and autonomously switch to reusing the first connection configuration for communicating in the network based at least in part on the first connection configuration being stored at the UE. Additionally, or alternatively, the communication manager 140 may perform one or more other operations described herein.

In some aspects, a network node (e.g., the network node 110 may include a communication manager 150. As described in more detail elsewhere herein, the communication manager 150 may transmit at least one of a first connection configuration or a second connection configuration; communicate with a user equipment (UE) in a network based at least in part on using the first connection configuration; communicate with the UE in the network based at least in part on using the second connection configuration; and communicate with the UE in the network based at least in part on reusing the first connection configuration and without an additional transmission of the first connection configuration. Additionally, or alternatively, the communication manager 150 may perform one or more other operations described herein.

As indicated above, FIG. 1 is provided as an example. Other examples may differ from what is described with regard to FIG. 1.

Figure 2:
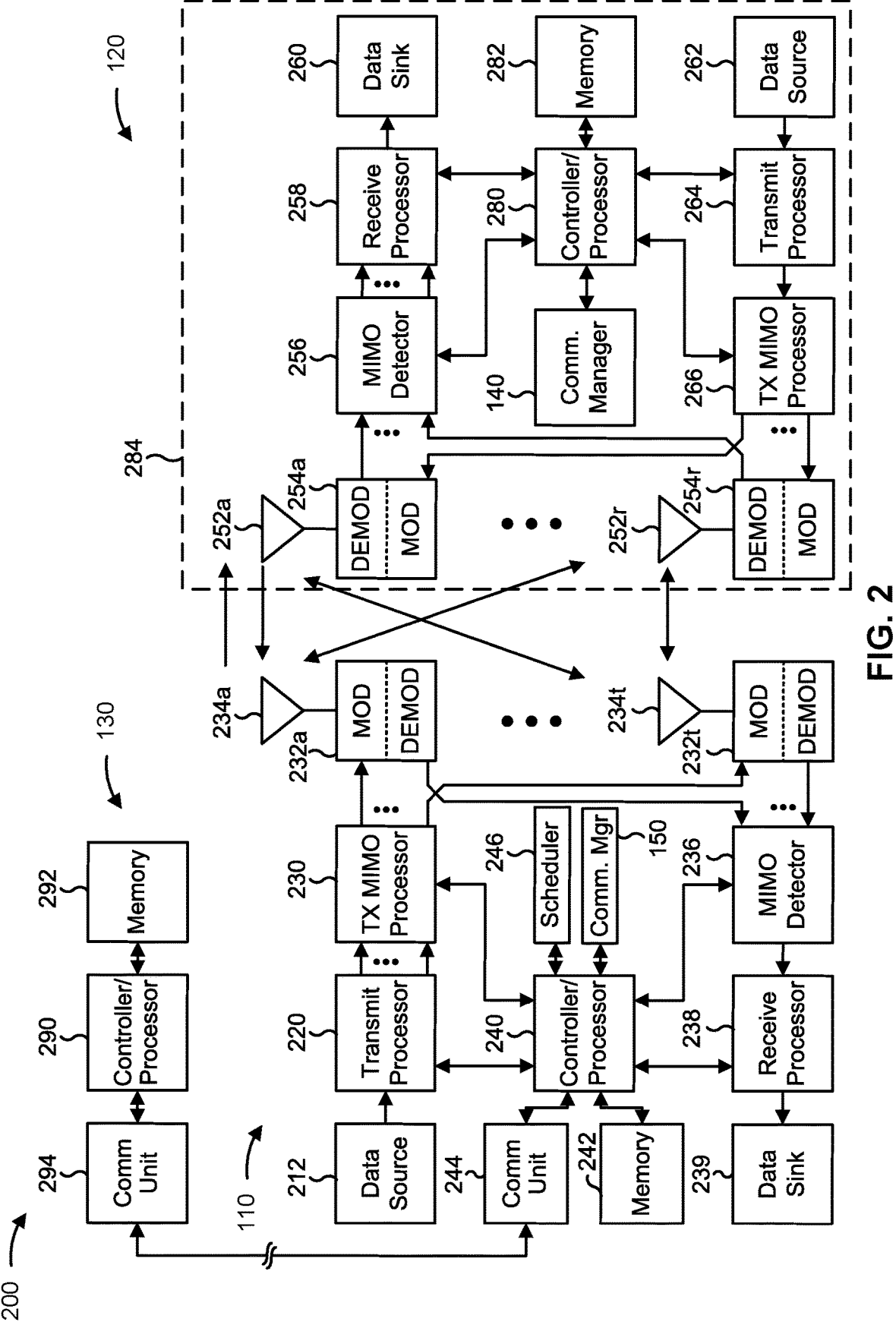
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-10).

The controller/processor 240 of the network node 110, the controller/processor 280 of the UE 120, and/or any other component(s) of FIG. 2 may perform one or more techniques associated with efficient configuration of a non-terrestrial network connection, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120) includes means for communicating in a network based at least in part on using a first connection configuration; means for communicating in the network based at least in part using a second connection configuration instead of the first connection configuration; and/or means for autonomously switching to reusing the first connection configuration for communicating in the network based at least in part on the first connection configuration being stored at the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting at least one of a first connection configuration or a second connection configuration; means for communicating with a UE in a network based at least in part on using the first connection configuration; means for communicating with the UE in the network based at least in part on using the second connection configuration; and/or means for communicating with the UE in the network based at least in part on reusing the first connection configuration and without an additional transmission of the first connection configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
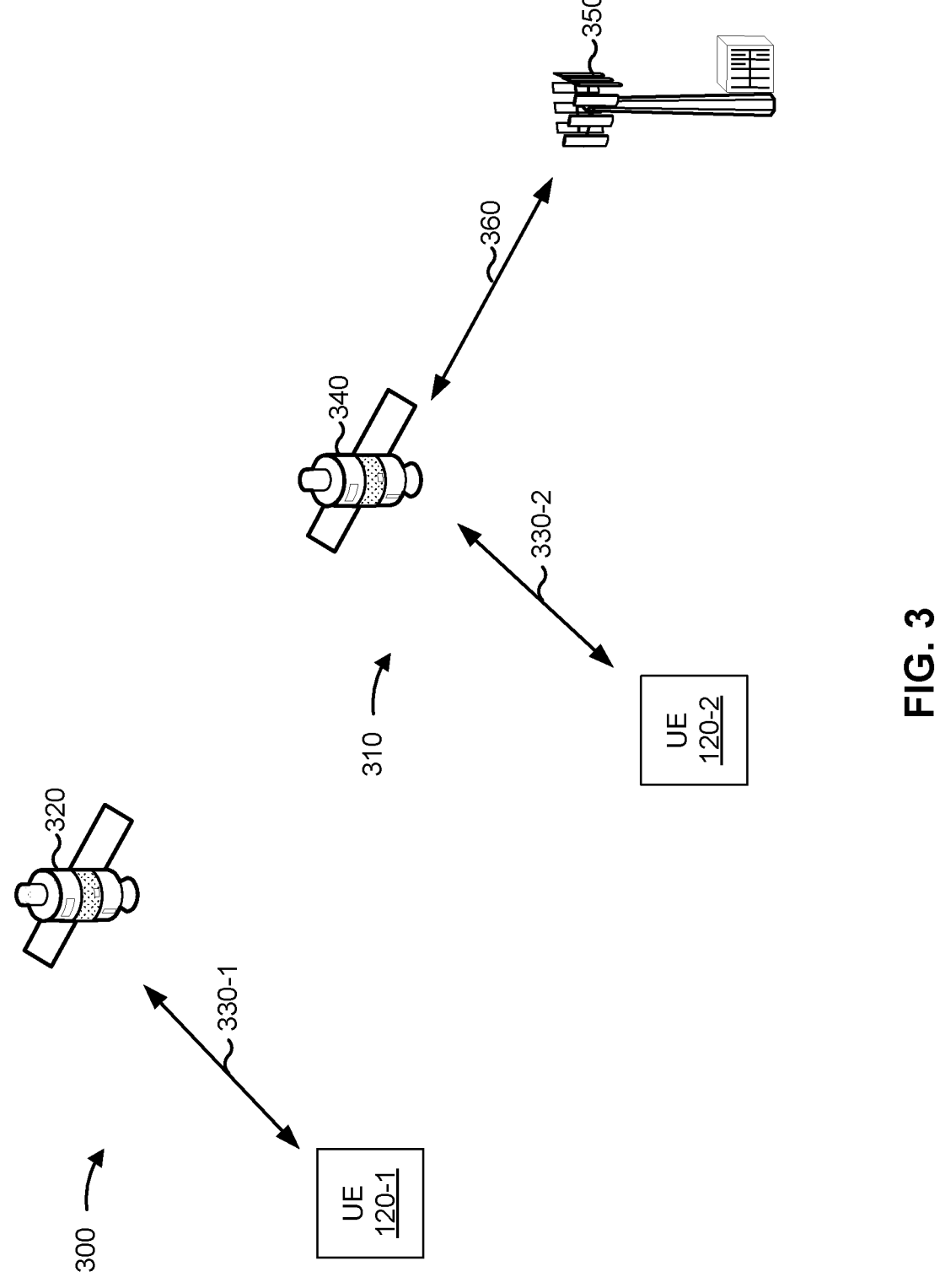
FIG. 3 is a diagram illustrating an example of a regenerative satellite deployment and an example of a transparent satellite deployment in a non-terrestrial network.

FIG. 3 is a diagram illustrating an example 300 of a regenerative satellite deployment and an example 310 of a transparent satellite deployment in a non-terrestrial network.

Example 300 shows a regenerative satellite deployment in which a first UE 120-1 is served by a satellite 320 via a service link 330-1. In some aspects, the satellite 320 may include base station capabilities (e.g., capabilities associated with the network node 110a and/or a gNB), and may be referred to as a non-terrestrial base station, a regenerative repeater, or an on-board processing repeater. Based at least in part on including the base station capabilities, the satellite 320 may demodulate an uplink radio frequency signal, and may modulate a baseband signal derived from the uplink radio signal to produce a downlink radio frequency transmission. To illustrate, the satellite 320 may transmit the downlink radio frequency signal on the service link 330-1. The satellite 320 may provide network access to the UE 120-1 over a coverage area (e.g., a cell coverage area). The first UE 120-1 may include a Global Navigation Satellite System (GNSS) capability or a Global Positioning System (GPS) capability.

Example 310 shows a transparent satellite deployment, which may also be referred to as a bent-pipe satellite deployment. In the example 310, a second UE 120-2 is served by a satellite 340 via the service link 330-2, where the satellite 340 may be referred to as a transparent satellite. To illustrate, the satellite 340 may act as a relay by receiving a signal from gateway 350 via a feeder link 360, and relaying the signal to the UE 120-2 via the service link 330-2. Alternatively or additionally, the satellite 340 may receive an uplink radio frequency transmission from the UE 120-2 via the service link 330-2, and relay the uplink radio frequency transmission to the gateway 350 via the feeder link 360 without demodulating the uplink radio frequency transmission. In some aspects, the satellite 340 may perform a frequency conversion on the uplink radio frequency transmission from a first frequency (e.g., associated with the service link 330-2) to a second frequency (e.g., associated with the feeder link 360), and may amplify and/or filter the uplink radio frequency transmission. The satellite 340 may provide network access to the UE 120-2 while the UE 120-2 operates in a coverage area associated with the satellite 340. The second UE 120-2 may include a GNSS capability or a GPS capability.

As shown by the example 310, the satellite 340 and the UE 120-2 may communicate with one another based at least in part on the service link 330-2. The service link 330-2 may include an uplink for transmitting an uplink communication (e.g., from the UE 120-2 to the gateway 350 by way of the satellite 340) and/or a downlink for transmitting a downlink communication (e.g., from the gateway 350 to the UE 120-2 by way of the satellite 340). In a similar manner, the satellite 340 and the gateway 350 may communicate with one another based at least in part on the feeder link 360, where the feeder link 360 may include an uplink for transmitting an uplink communication and/or a downlink for transmitting a downlink communication.

The feeder link 360, the service link 330-1, and/or the service link 330-2 may each experience Doppler shift due to the movement of the satellites 320 and 340, and/or movement of the UE 120-1 or the UE 120-2. A Doppler shift associated with satellite movement may be significantly larger than a Doppler shift associated with a terrestrial network, based at least in part on a speed at which a satellite moves. In some aspects, a transmitting device may pre-compensate for a satellite-based Doppler shift. To illustrate, the feeder link 360 between the gateway 350 and the satellite 340 may be a 1:1 link between a single transmitting device and a single receiving device. Based at least in part on the feeder link 360 being a 1:1 link, the gateway 350 and/or another network node may estimate a feeder link Doppler shift and pre-compensate (e.g., modify the transmitted signal) to mitigate the Doppler shift observed by the satellite 340. The satellite 340 may communicate with multiple UEs at varying locations based at least in part on a 1:N link, where N is an integer that may be greater than 1. To illustrate, the satellite 340 may broadcast information that is received and processed by N UEs at varying locations. The varying locations of the receiving UEs may result in each UE observing a different service link Doppler shift. Accordingly, the satellite 340 may refrain from applying pre-compensation for a service link Doppler shift based at least in part on the 1:N link and the variation in the observed service link Doppler shift between each UE. These sources of frequency error may cause a received downlink frequency at the UE 120 to drift from a target downlink frequency.

As indicated above, FIG. 3 is provided as an example. Other examples may differ from what is described with regard to FIG. 3.

FIGS. 4A, 4B, 4C, and 4D are diagrams illustrating an example 400 (shown as 400-1, 400-2, 400-3, and 400-4, respectively) of a UE 120 connecting to a non-terrestrial network node (e.g., a satellite) over time, in accordance with the present disclosure.

An NTN may provide wireless access and/or service coverage in areas in which terrestrial cellular service is unavailable and/or difficult to reach (e.g., a mountain top, a body of water, and/or a canyon). In some aspects, a wireless connection between a UE and a non-terrestrial network node (e.g., implemented based at least in part on a satellite, a drone, and/or a balloon) may be characterized and/or operable based at least in part on the non-terrestrial network node and/or the UE having a line of sight (LoS) with one another.

To illustrate, an uplink signal from the UE to a satellite may propagate upward and into the sky rather than propagating along a ground surface in an LoS manner. Based at least in part on the signal propagating upward into the sky in a LoS manner from the UE to a non-terrestrial network node, the UE may observe a same channel condition when communicating with different non-terrestrial network nodes as each non-terrestrial network node operates at a same and/or commensurate (e.g., within a range of values and/or within a threshold distance) location.

Figures 4A, 4B:
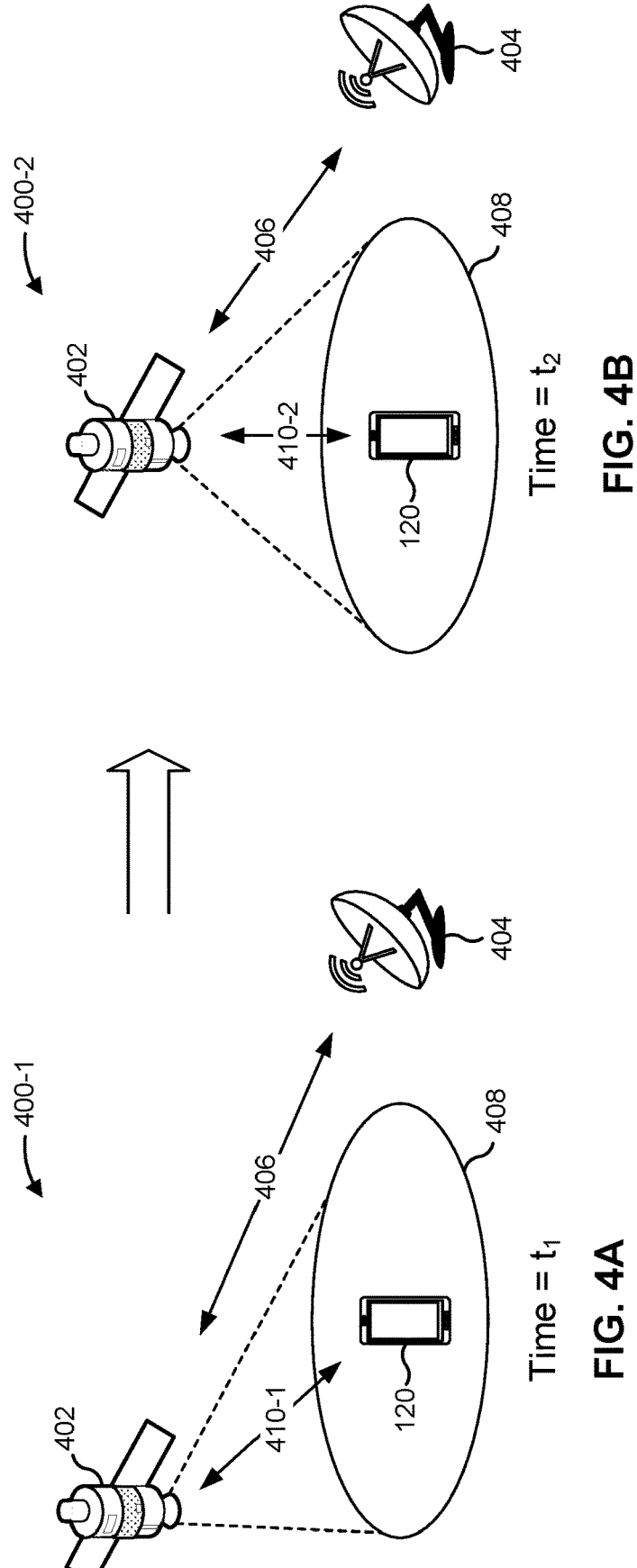
FIGS. 4A, 4B, 4C, and 4D are diagrams illustrating an example of a UE connecting to a non-terrestrial network node over time, in accordance with the present disclosure.

Example 400-1 shown by FIG. 4A illustrates a first satellite 402 at a first point in time (e.g., time=$t_1$). The first satellite 402 may be wirelessly linked to a ground station 404 based at least in part on a first wireless connection 406. At time $t_1$, the first satellite 402 may be located at a first position and/or may provide service over a coverage area 408. Accordingly, a UE 120 operating within the coverage area 408 may wirelessly link to the first satellite 402 based at least in part on a second wireless connection 410-1. In some aspects, the second wireless connection 410-1 may be based at least in part on a first connection configuration. To illustrate, the first connection configuration may be based at least in part on one or more parameters indicated in a radio resource control (RRC) connection setup message and/or an RRC connection reconfiguration message, such as any combination of one or more measurement configuration parameters (e.g., a measurement timing parameter for measuring a signal quality associated with one or more cells), one or more radio bearer configuration parameters and/or logical channel parameters (e.g. a hybrid automatic repeat request (HARQ) feedback mode and/or state), and/or one or more cell configuration parameters (e.g., a beam configuration parameter and/or an antenna polarization mode). In some aspects, the one or more parameters may be based at least in part on a current location of the first satellite 402 and/or the UE 120.

Example 400-2 shown by FIG. 4B illustrates the first satellite 402 at a second point in time (e.g., time=$t_2$), where the first satellite 402 has moved to a second, different location. In some aspects, the first satellite 402 may update and/or change one or more parameters associated with establishing and/or maintaining the wireless connection to the UE 120 (shown as second wireless connection 401-2 in FIG. 4B). That is, the second wireless connection 410-2 may be based at least in part on a second connection configuration that indicates at least one different parameter relative to the first connection configuration. The second connection configuration may be based at least in part on the first satellite 402 moving locations. For instance, a signal quality that satisfies a quality threshold at time=$t_1$ (e.g., when the first satellite 402 is operating at a first location as shown by the example 400-1) may fail to satisfy the quality threshold at time=$t_2$ (e.g., when the first satellite is operating at the second location as shown by the example 400-2). Accordingly, the first satellite 402 and/or the ground station 404 may select a connection configuration that improves a performance of the connection (e.g., increases a data rate, decreases recovery errors, and/or improves reliability) while the first satellite 402 communicates with the UE 120 at the second location. In some aspects, the first satellite 402 may transmit an indication of the second connection configuration to the UE 120, such as in an RRC message.

Figures 4C, 4D:
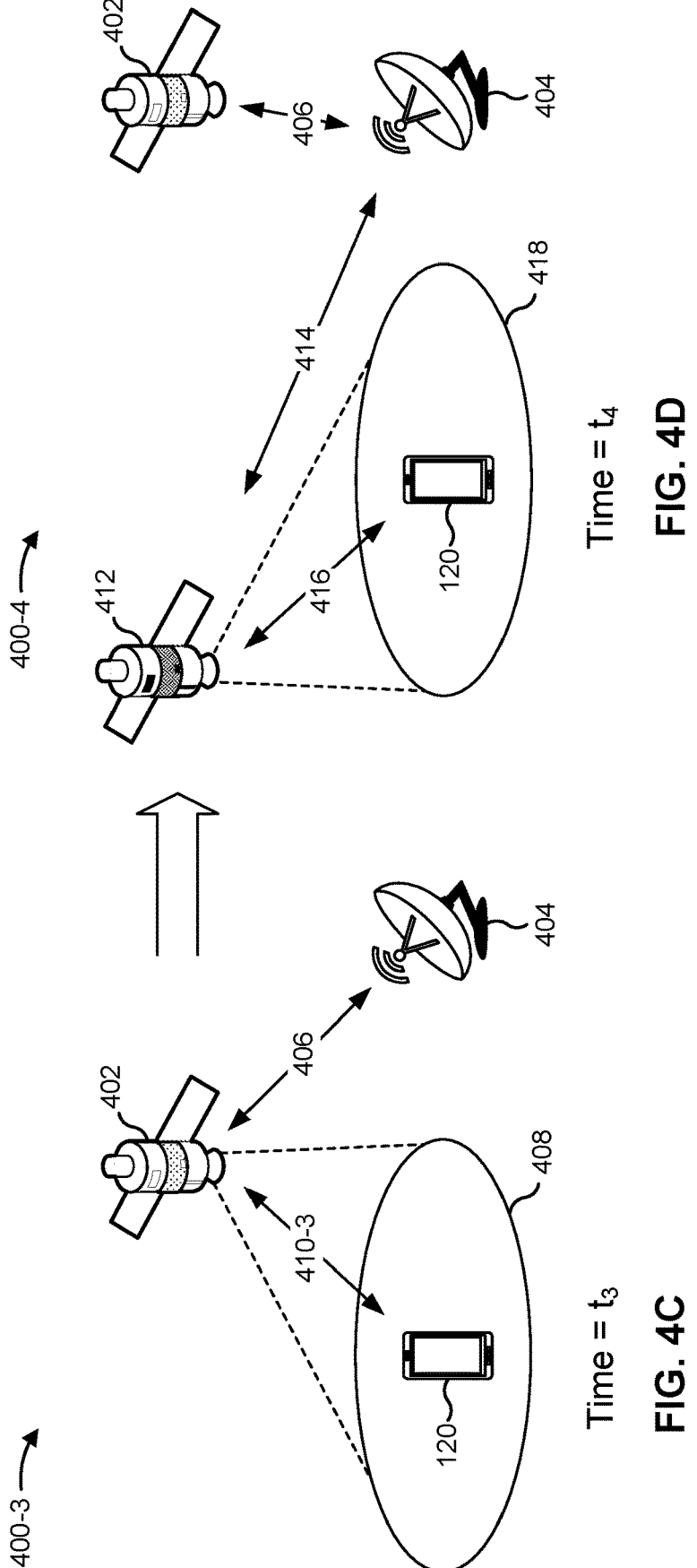

Example 400-3 shown by FIG. 4C illustrates the first satellite 402 at a third point in time (e.g., time=$t_3$). At time=$t_3$, the first satellite 402 has moved to a third, different location. As described above, the first satellite 402 may update and/or change one or more parameters associated with establishing and/or maintaining the wireless link with the UE 120 (shown as second wireless connection 410-3 in FIG. 4C). As described above, the second wireless connection 410-3 may be based at least in part on a third connection configuration that is different from the first connection configuration and/or the second connection configuration. For example, the third connection configuration may be based at least in part on the first satellite 402 operating at the third location. In some aspects, the first satellite 402 may transmit an indication of the third connection configuration to the UE 120, such as in an RRC message.

Example 400-4 shown by FIG. 4D illustrates the first satellite 402 at a fourth point in time (e.g., time=$t_4$), where the first satellite 402 has moved to a fourth, different location. At time=$t_4$, the coverage area provided by the first satellite 402 fails to overlap with the UE 120. That is, the first satellite 402 may be unable to provide the UE 120 with reliable access to the NTN and/or may be disconnected from the UE 120. As shown by the example 400-4, a second satellite 412 in communication with the ground station 404 based at least in part on a third wireless connection 414 may move to the first location and establish a fourth wireless connection 416 with the UE 120. For example, the UE 120 may be positioned in a location within a coverage area 418 provided by the second satellite 412. In some aspects, the ground station 404, the second satellite 412, and/or the first satellite 402 may communicate a fourth connection configuration (e.g., associated with establishing and/or maintaining the fourth wireless connection 416) to the UE 120, such as in an RRC message. To illustrate, the UE 120 may receive the fourth connection configuration as part of a handover message associated with the UE 120 changing from communicating with the first satellite 402 to communicating with the second satellite 412.

In an NTN, a group of satellites may travel in a same path and/or commensurate paths (e.g., paths that are within a range of distance values and/or within a distance threshold of one another). To illustrate, the first satellite 402 and the second satellite 412 may travel the same and/or commensurate path such that the UE 120 may observe similar channel characteristics when communicating with the first satellite 402 using the second wireless connection 410-1 (e.g., at time=$t_1$ and the first satellite 402 is at the first location) and the second satellite 412 using the fourth wireless connection 416 (e.g., at time=$t_4$ and the second satellite 412 is at the first location). Accordingly, iteratively changing which connection configuration is used to communicate in the NTN at various points in time (e.g., changing from using a first connection configuration to a second connection configuration at a first point in time, changing from using the second connection configuration to a third connection configuration at a second point in time, and/or changing from using the third connection configuration to the first connection configuration at a third point in time) may result in the transmission of redundant information, increase signaling overhead, and/or consume air interface resources. To illustrate, the first connection configuration associated with the second wireless link 410-1 may include commensurate and/or same parameters as the fourth connection configuration associated with the fourth wireless connection 416. The redundancy, and consumption of air interface resources, may compound for a satellite with 1:N connections to N UEs. The increased consumption of air interface resources associated with the increased signaling overhead and/or redundant transmissions may reduce a capacity of the NTN (e.g., reduce a number of supportable UEs), increase data transfer latencies in the NTN, and/or reduce data throughput in the NTN.

Some techniques and apparatuses described herein provide efficient configuration of a non-terrestrial network connection. A UE may communicate in a network (e.g., a non-terrestrial wireless network and/or a terrestrial wireless network) based at least in part on using a first connection configuration. To illustrate, at a first point in time, the UE may receive the first connection configuration from a network node and/or instructions to communicate in the network using the first connection configuration. At a second point in time, the UE may communicate in the network based at least in part using a second connection configuration instead of the first connection configuration. For example, the UE may receive the second connection configuration from the network node and/or instructions to switch to the second connection communication for communicating in the network. At a third point in time, the UE may autonomously switch to reusing the first connection configuration for communicating in the network based at least in part on the first connection configuration being stored at the UE. That is, the UE may autonomously switch to using the first connection configuration without receiving an additional transmission that includes (another transmission of) the first connection configuration. In some aspects, the UE may autonomously switch to using the first connection configuration without receiving an instruction to reuse the first connection configuration.

In some aspects, a network node may transmit at least one of a first connection configuration or a second connection configuration. To illustrate, the network node may transmit the first connection configuration in a first transmission and the second connection configuration in a second transmission (e.g., at different points in time). Alternatively, the network node may transmit the first connection configuration and the second connection configuration in a same transmission. The network node may communicate with a UE based at least in part on using the first connection configuration (e.g., at a first point in time). For example, the network node may instruct the UE to communicate in the network based at least in part on using the first connection configuration. In some aspects, the network node may communicate with the UE in the network based at least in part on using the second connection configuration (e.g., at a second point in time). To illustrate, the network node may instruct the UE to communicate in the network based at least in part on using the second connection configuration (and/or to cease using the first connection configuration). The network node may communicate with the UE in the network (e.g., at a third point in time) based at least in part on reusing the first connection configuration and without an additional transmission of the first connection configuration. That is, the UE may autonomously switch to using the first connection configuration and/or indicate to the network node the autonomous switch to the first connection configuration.

By storing a connection configuration, a UE may reduce signaling overhead in an NTN. That is, the UE may reuse a connection configuration stored at the UE and reduce a signaling overhead by a network node (e.g., a non-terrestrial network node) by mitigating redundant transmissions. Reducing the signaling overhead preserves air interface resources for other communications in the NTN, increases a capacity of the NTN, reduces data transfer latencies in the NTN, and/or increases data throughput in the NTN.

FIGS. 4A, 4B, 4C, and 4D are provided as an example. Other examples may differ from what is described with regard to FIGS. 4A, 4B, 4C, and 4D.

Figure 5A:
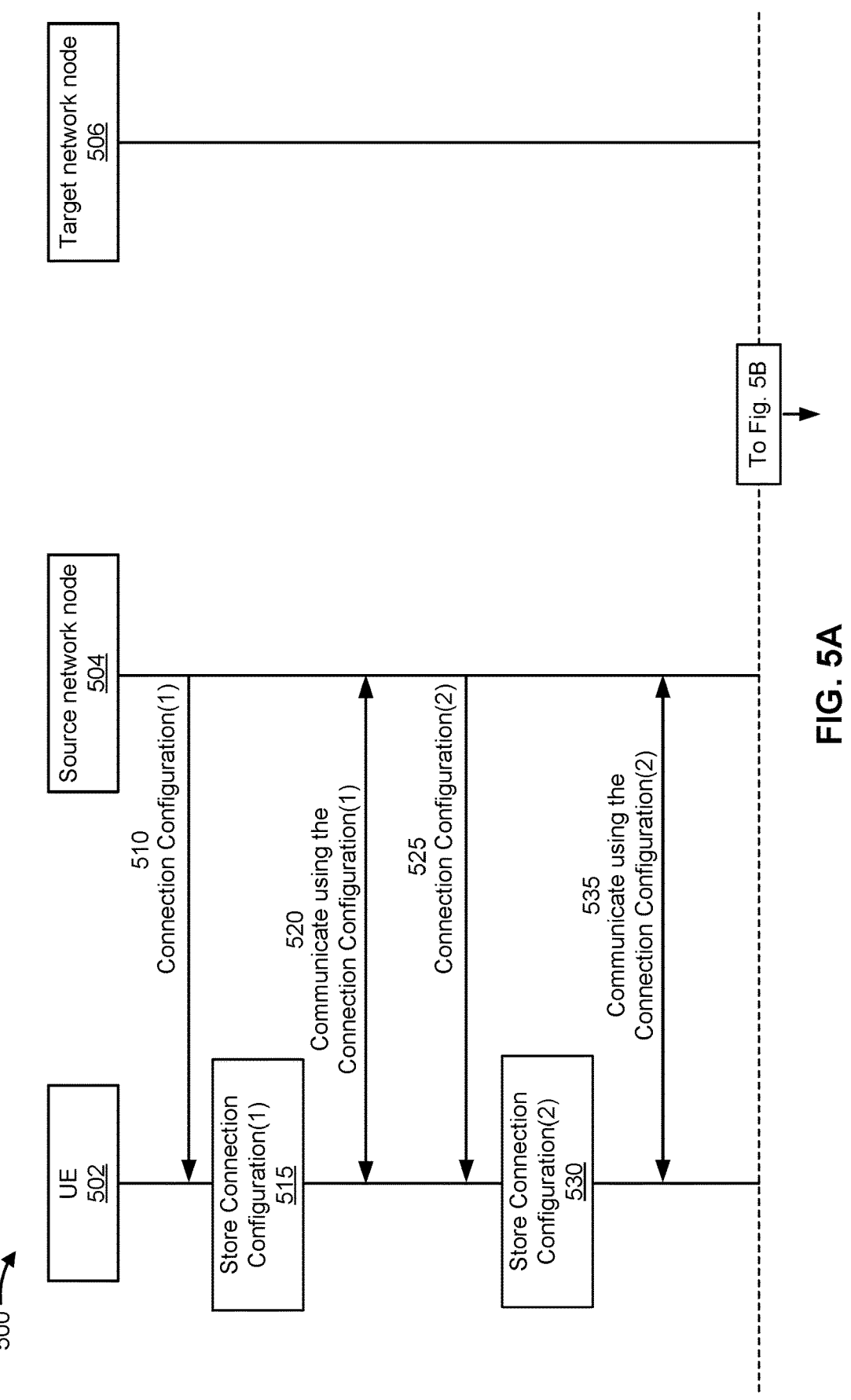
FIGS. 5A and 5B illustrate a diagram of an example of a wireless communication process between a UE, a source network node, and a target network node, in accordance with the present disclosure.
Figure 5B:
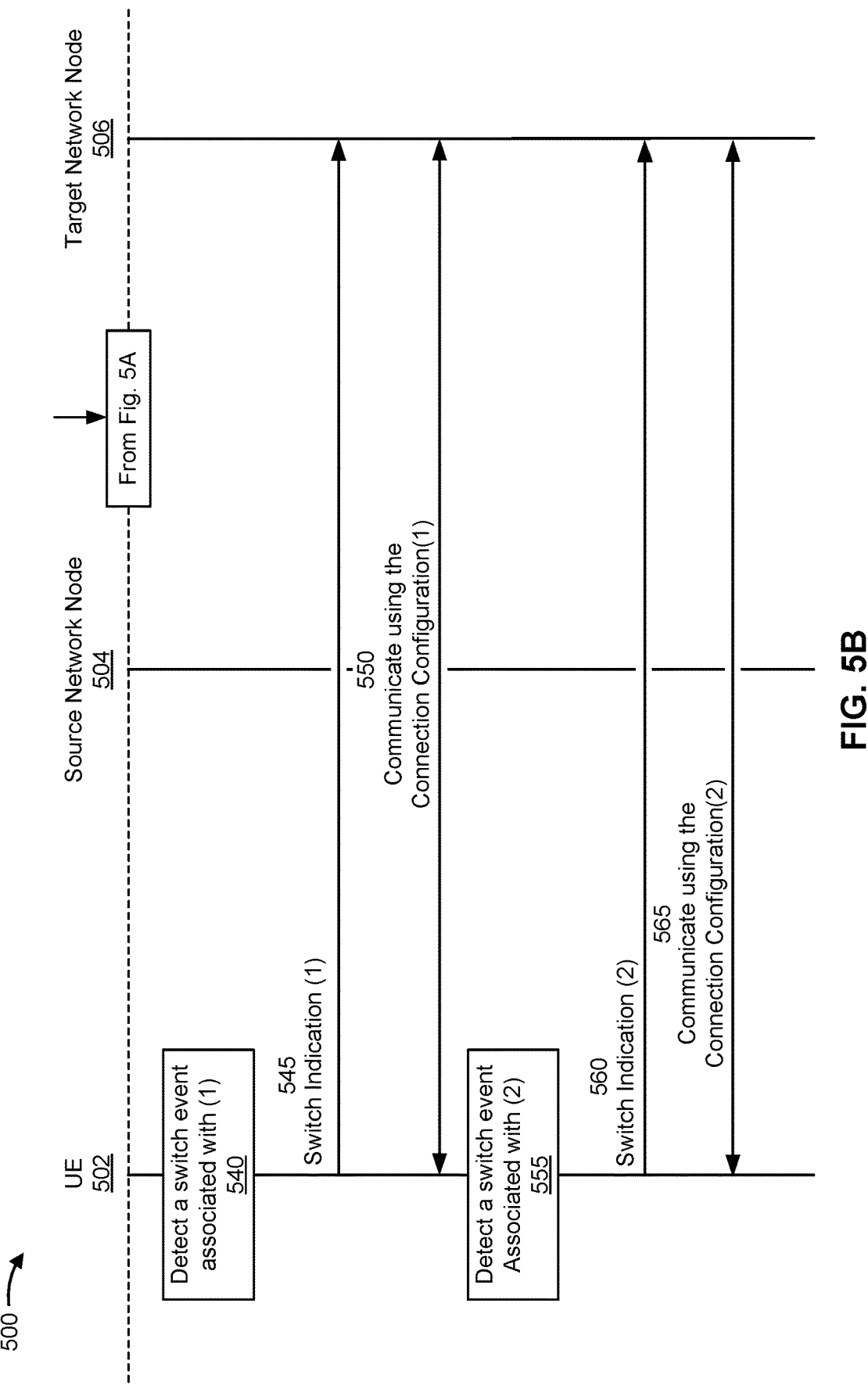

FIGS. 5A and 5B illustrate a diagram of an example 500 of a wireless communication process between a UE 502 (e.g., a UE 120), a source network node 504 (e.g., a non-terrestrial network node 110 and/or a satellite), and a target network node 506 (e.g., another non-terrestrial network node 110 and/or another satellite), in accordance with the present disclosure. Although the example 500 shows both the source network node 504 and the target network node 506, other examples may include a single network node. To illustrate, in at least one example, signaling shown between the UE 502 and the target network node 506 in the example 500 may alternatively be implemented between the UE 502 and the source network node 504.

Starting with FIG. 5A, and as shown by reference number 510, a source network node 504 may transmit, and a UE 502 may receive, an indication of a first connection configuration, which is shown in FIG. 5A as connection configuration (1). To illustrate, the source network node 504 may transmit the first connection configuration based at least in part on an RRC message, such as an RRC connection setup message and/or an RRC reconfiguration message. The connection configuration may indicate one or more parameters associated with establishing and/or maintaining a wireless connection in an NTN, such as one or more parameters associated with a radio bearer configuration and/or one or more parameters associated with a cell configuration.

In some aspects, the source network node 504 may transmit, with the indication of the first connection configuration, a configuration identifier. For example, the source network node 504 may assign a unique identifier to the first connection configuration and transmit the unique identifier (and/or an indication of the unique identifier) with the first connection configuration. Alternatively or additionally the connection identifier may be based at least in part on one or more other identifiers, such as a beam identifier, a satellite identifier, and/or a cell identifier. To illustrate, the source network node 504 may transmit an indication of a beam identifier, and the UE 502 may derive the configuration identifier from the beam identifier (e.g., either by using the beam identifier as the configuration identifier and/or by applying a decoding algorithm that extracts and/or generates the configuration identifier from the beam identifier).

As shown by reference number 515, the UE 502 may store the first connection configuration. That is, the UE 502 may store the first connection configuration locally, such as in a local memory device of the UE. Alternatively or additionally, the UE 502 may store the connection identifier associated with the first connection configuration in the local memory device.

As shown by reference number 520, the source network node 504 and the UE 502 may communicate using the first connection configuration. For example, the source network node 504 may transmit a downlink communication based at least in part on a beam specified by the first connection configuration and/or the UE 502 may configure an antenna and/or receiver based at least in part on the beam specified by the second connection configuration. As another example, the UE 502 may transmit an uplink communication based at least in part on a target power level specified by the first connection configuration and/or a bandwidth part (BWP) specified by the first connection configuration.

As shown by reference number 525, the source network node 504 may transmit, and the UE 502 may receive, an indication of a second connection configuration, which is shown inf FIG. 5A as connection configuration (2). As one example, the source network node 504 may be a satellite that moves from a first location to a second location as described with regard to FIGS. 4A-4D. In some aspects, the source network node 504 may receive and/or generate a measurement result that indicates a signal power level fails to satisfy a quality threshold. Accordingly, the source network node 504 may select a second connection configuration to increase the signal power level, such as by selecting a second, different beam that improves a propagation path of the beam between the source network node 504 and the UE 502 (e.g., a LoS propagation path). That is, the source network node 504 may select the second, different beam based at least in part on a location of the source network node 504 and/or a location associated with the UE 502. The source network node 504 may transmit an indication of the second connection configuration to the UE 502 and/or indicate to use the second connection configuration for communication in the NTN (e.g., with the source network node 504). As described above, the source network node 504 may transmit a (unique) configuration identifier that is associated with the second connection configuration. The source network node may transmit the second connection configuration and/or the configuration identifier in an RRC message (e.g., an RRC reconfiguration message and/or an RRC connection setup message).

Alternatively, or additionally, the UE 120 may derive the configuration identifier associated with the second connection configuration (e.g., from another identifier).

In some aspects, the source network node 504 may transmit an update indication that specifies to update one or more parameters associated with a connection configuration (e.g., the first connection configuration and/or the second connection configuration stored locally at the UE 502). To illustrate, the source network node 504 may determine to update a beam selection associated with the first connection configuration and transmit an update indication that indicates the updated beam selection. Based at least in part on receiving the update indication, the UE 120 may update the one or more parameters associated with the associated connection configuration (e.g., update a beam selection stored in local memory as part of the first connection configuration).

As shown by reference number 530, the UE 502 may store the second connection configuration. That is, the UE 502 may store the second connection configuration locally, such as in a local memory device of the UE. Alternatively or additionally, the UE 502 may store the connection identifier associated with the second connection configuration in the local memory device.

As shown by reference number 535, the source network node 504 and the UE 502 may communicate based at least in part on using the second connection configuration. For example, the source network node 504 may transmit a downlink communication based at least in part on a beam specified by the second connection configuration and/or the UE 502 may configure an antenna and/or receiver based at least in part on the beam specified by the second connection configuration. As another example, the UE 502 may transmit an uplink communication based at least in part on a target power level and/or a BWP specified by the second connection configuration. As shown by FIG. 5A, the example 500 proceeds to FIG. 5B.

As shown by reference number 540 of FIG. 5B, the UE 502 may detect a switch event associated with a connection configuration. To illustrate, the source network node 504 may move to a location at which a signal quality of communications with the UE 502 fails to satisfy a quality threshold, and the source network node may determine to perform a handover of the UE 502 to a target network node

506. The UE 502 may receive an RRC message that indicates a handover command associated with performing a handover from the source network node 504 to the target network node 506. In some aspects, the RRC message may indicate to use a same connection configuration that was used to communicate with the source network node 504 (e.g., by indicating a connection identifier) and/or may not indicate a connection configuration to the UE 502 (e.g., to preserve air interface resources).

The UE 502 may detect, as the switch event, that a signal metric (e.g., an RSRP metric, a channel state information (CSI) metric, and/or an RSSI metric) associated with the target network node 506 satisfies a switch condition. For example, the switch condition may be associated with a connection configuration, such as a first switch condition associated with the first connection configuration. Alternatively or additionally, a second switch condition may be associated with the second (current) connection configuration. In some aspects, the UE 502 may detect, as the switch event, that the signal metric satisfies the first switch condition and/or fails to satisfy the second switch condition. In some aspects, the UE 502 may detect, as the switch event, receipt of a handover command.

As another example, the UE 502 may detect, as the switch event, that a current satellite location satisfies a satellite location condition. For example, the UE 502 may receive ephemeris data associated with the target network node 506 and determine that the current location of the target network node 506 satisfies a first satellite location condition that is associated with the first connection configuration and/or fails to satisfy a second satellite location condition associated with the second connection configuration. Alternatively or additionally, the UE 502 may detect, as a switch event, that current satellite ephemeris associated with the target network node 506 is commensurate (e.g., within a range of values or within a threshold of a value) with first satellite ephemeris associated with the first connection configuration (and/or not commensurate with second satellite ephemeris associated with the second connection configuration).

In some aspects, the UE 502 may detect, as the switch event, that a current elevation angle associated with communicating with the target network node 506 is commensurate with an elevation angle associated with the first connection configuration. Other examples may include the UE 502 detecting, as the switch event, that a current UE location satisfies a UE location condition (e.g., associated with the first connection configuration), that a current time occurs within a configured time duration associated with the first connection configuration, and/or that a current connection identifier is associated with the first connection configuration. Examples of the connection identifier may include and/or be based at least in part on a beam identifier, a satellite identifier, and/or a cell identifier. As described above, detecting a switch event may be based at least in part on identifying that another connection configuration (e.g., that is not currently being used to communicate in the NTN) may be associated with satisfying a condition of a switch event and/or that a current connection configuration (e.g., currently being used to communicate in the NTN) is not associated with a condition that satisfies the switch event. In some aspects, the UE may receive (e.g., via a system information block (SIB) and/or an RRC message) an indication of a switch event configuration that specifies one or more switch events. The UE may receive an indication of a switch event configuration in a same or a different message as the message carrying the connection configuration associated with the switch event(s). Alternatively or additionally, the UE may be pre-configured with one or more switch event configurations (e.g., the switch event configuration is stored locally at the UE).

As shown by reference number 545, the UE 502 may transmit, and the target network node 506 may receive, a switch indication. To illustrate, the UE 502 may detect a switch event associated with the first connection configuration as described with regard to reference number 540, and determine (autonomously) to switch to using the first connection configuration to communicate in the NTN (e.g., with the target network node 506). Accordingly, the UE 502 may transmit a switch indication that is associated with autonomously switching to a different connection configuration, such as the first connection configuration that is associated with the switch event. In some aspects, the switch indication may specify and/or indicate a configuration identifier that is associated with a connection configuration and/or the detected switch event. To illustrate, the switch indication may specify, by way of the configuration identifier, a connection configuration that the UE 502 is switching to for communicating in the NTN. The UE 502 may transmit the switch indication in a single and/or combination of uplink control information, a MAC control element (CE), and/or an RRC message. While the example 500 shows the UE 502 transmitting a switch indication, other examples may include the UE 502 refraining from transmitting the switch indication. Alternatively or additionally, the target network node 506 may detect a same switch event as the UE 502 and transmit a switch indication to the UE 502 (e.g., without transmitting multiple configuration parameters).

In some aspects, the target network node 506 may transmit, and the UE 502 may receive, a switch indication response that indicates receipt of the switch indication, that the target network node 506 agrees to use the associated connection configuration, and/or an acknowledgement of the switch (e.g., to the connection configuration). That is, the target network node 506 may transmit the switch indication response based at least in part on receiving the switch indication. However, in other examples, the target network node 506 may refrain from transmitting a switch indication response.

As shown by reference number 550, the target network node 506 and the UE 502 may communicate using the first connection configuration. For instance, the UE 502 may autonomously switch from communicating in the NTN based at least in part on using the second connection configuration, to communicating in the NTN based at least in part on (re)using the first connection configuration that is stored local to the UE 502 (e.g., without receiving an additional transmission that includes the first connection configuration). Alternatively or additionally, the target network node 506 may communicate in the NTN based at least in part on the first connection configuration. In some aspects, the target network node 506 may use at least a portion of the first connection configuration to communicate with the UE 502 based at least in part on receiving a switch indication from the UE 502 and/or based at least in part on detecting a same switch event as the UE 502. In some aspects, if the target network node 506 does not receive a switch indication from the UE 502 (e.g., within a time duration threshold of the target network node 506 detecting the switch event), the target network node 506 may send and/or indicate the connection configuration associated with the switch event to the UE.

To illustrate communicating based at least in part on using the first connection configuration, the target network node 506 may transmit a downlink communication using a beam specified by the first connection configuration and/or the UE 502 may receive the downlink communication by (re)configuring an antenna and/or receiver based at least in part on the beam specified by the first connection configuration. As another example, the UE 502 may transmit an uplink communication based at least in part on a target power level specified and/or a BWP specified by the first connection configuration. Accordingly, in some aspects, the UE 502 may receive the first connection configuration from the source network node 504 (e.g., for communicating with the source network node 504), and reuse the first connection configuration to communicate with the target network node 506. That is, to preserve air interface resources, the UE 502 may reuse a connection configuration stored locally at the UE instead of receiving an RRC message (e.g., a RRC connection setup message and/or an RRC reconfiguration message) that includes the one or more parameters of the connection configuration.

In some aspects, the target network node 506 may transmit, and the UE 502 may receive, an additional connection configuration parameter that is unspecified by the first connection configuration, such as satellite ephemeris information associated with the target network node 506 and/or one or more common timing advance (TA) parameters associated to the target network node 506. Accordingly, the target network node 506 and the UE 502 may communicate with one another based at least in part on the first connection configuration and the additional connection configuration parameter.

As shown by reference 555, the UE 502 may detect a switch event associated with the second connection configuration. As described above, the switch event may be based at least in part on any combination of a signal metric, a current satellite location (e.g., associated with the target network node 506), current satellite ephemeris, a current elevation angle, a current UE location, a current time, and/or a current connection identifier.

As shown by reference number 560, the UE 502 may transmit, and the target network node 506 may receive, a (second) switch indication. As described above, the UE 502 may transmit the (second) switch indication in at least one of an RRC message, uplink control information, and/or a MAC CE. Alternatively or additionally, the switch indication may specify and/or indicate a connection identifier associated with the second connection configuration. While the example 500 shows the UE 502 transmitting the switching indication, in other examples, the UE 502 may not transmit the switch indication. In some aspects, the target network node 506 may transmit a switch indication response to the UE 502, while in other aspects, the target network node 506 may refrain from transmitting the switch indication response.

As shown by reference number 565, the target network node 506 and the UE 502 may communicate based at least in part on using the second connection configuration. That is, the UE 502 may autonomously switch (and/or the target network node 506 may switch) from using the first connection configuration (e.g., for communicating with the target network node 506) to (re)using the second connection configuration (e.g., for communicating with the target network node 506) that is stored at the UE 502 (re)using the first connection configuration that is stored local to the UE 502 (e.g., without receiving an additional transmission that includes the second connection configuration) as described above. In some aspects, the target network node 506 may transmit, and the UE 502 may receive, an additional connection configuration parameter that is unspecified by the second connection configuration.

By storing a connection configuration, a UE may reduce signaling overhead in an NTN. That is, the UE may reuse a connection configuration stored at the UE and reduce a signaling overhead by a network node (e.g., a non-terrestrial network node) by mitigating redundant transmissions. Reducing the signaling overhead preserves air interface resources for other communications in the NTN, increases a capacity of the NTN, reduces data transfer latencies in the NTN, and/or increases data throughput in the NTN.

As indicated above, FIGS. 5A and 5B are provided as an example. Other examples may differ from what is described with regard to FIGS. 5A and 5B.

Figure 6A:
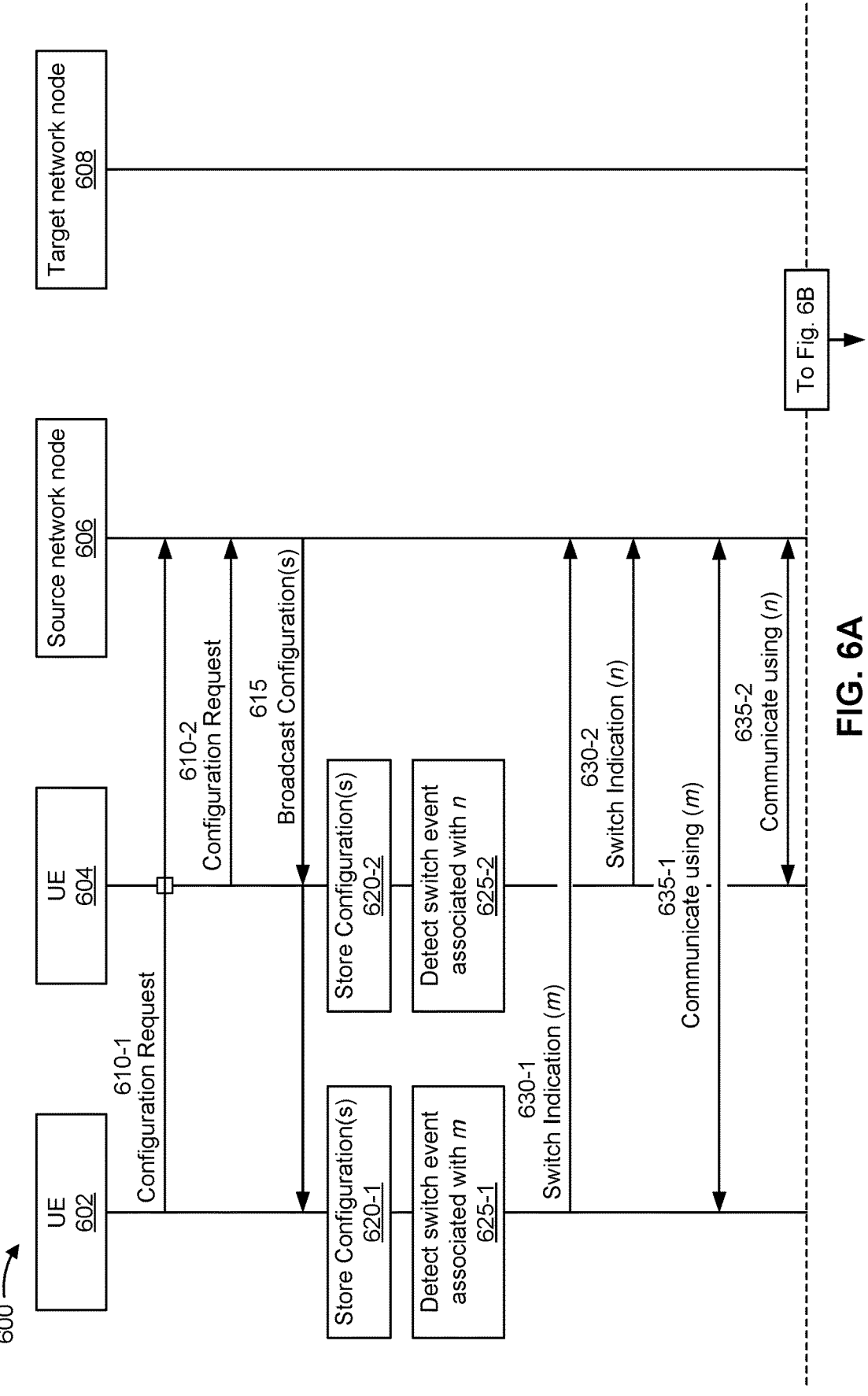
FIGS. 6A and 6B illustrate a diagram of an example of a wireless communication process between a first UE, a second UE, a source network node, and a target network node, in accordance with the present disclosure.
Figure 6B:
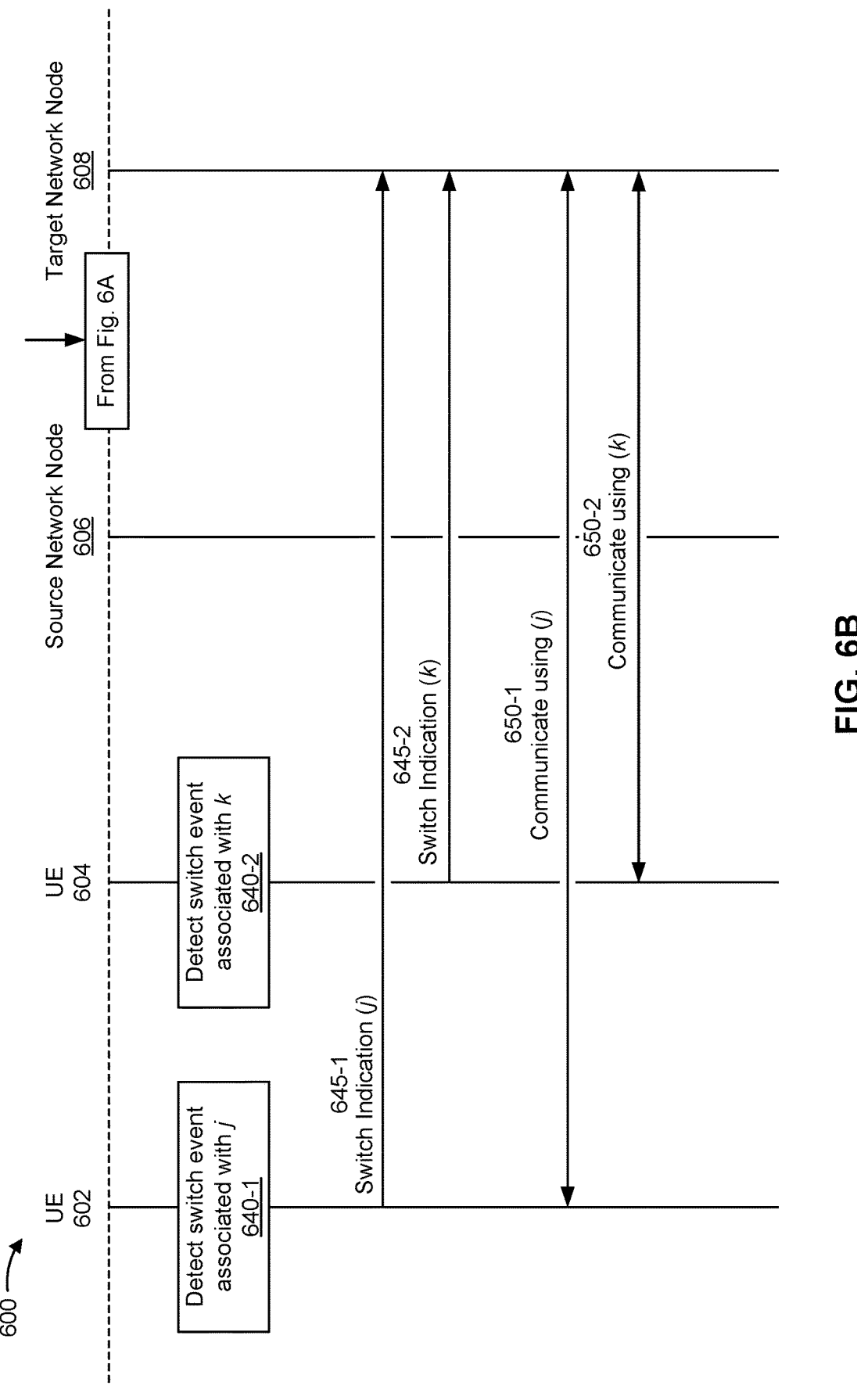

FIGS. 6A and 6B illustrate a diagram of an example 600 of a wireless communication process between a first UE 602 (e.g., a UE 120), a second UE 604 (e.g., another UE 120), a source network node 606 (e.g., a non-terrestrial network node 110 and/or a satellite), and a target network node 608 (e.g., another non-terrestrial network node 110 and/or another satellite), in accordance with the present disclosure. Although the example 600 shows two UEs, a source network node, and a target network node, other examples may include a single network node, a single UE, more network nodes, and/or more UEs. To illustrate, in at least one example, signaling associated with the target network node 608 may alternatively be associated with the source network node 606.

Starting with FIG. 6A, and as shown by reference number 610-1, a first UE 602 may transmit, and a source network node 606 may receive, a first configuration request. Alternatively or additionally, and as shown by reference number 610-2, a second UE 604 may transmit, and the source network node 606 may receive, a second configuration request. To illustrate, the first UE 602 and/or the second UE 604 may transmit the configuration request as part of an initial access procedure (e.g., in a random access channel (RACH) transmission). In some aspects, the configuration request may indicate a request for one or more connection configurations associated with communicating in an NTN, such as the first connection configuration and/or the second connection configuration as described with regard to FIGS. 5A and 5B. While the example 600 shows the first UE 602 and/or the second UE 604 transmitting respective configuration requests, other examples may include neither UE transmitting a configuration request and/or only a single UE transmitting a configuration request.

As shown by reference number 615, the source network node 606 may transmit, and the first UE 602 and/or the second UE 604 may receive, a configuration indication. In some aspects, the source network node 606 may transmit a configuration indication that specifies a set of connection configurations (e.g., multiple connection configurations) and/or multiple connection identifiers (e.g., a respective connection identifier that is associated with a respective connection configuration). The source network node 606 may transmit the configuration indication autonomously.

Alternatively, the source network node 606 may transmit the configuration indication based at least in part on receiving a configuration request. In some aspects, the first UE 602 and/or the second UE 604 may receive the configuration indication prior to communicating in an RRC connected state.

In some aspects, the source network node 606 may transmit, as the configuration indication, a set of parameters associated with one or more connection configurations. To illustrate, the set of parameters may include one or more parameters associated with configuring the UE's behavior when operating in a radio resource control idle (RRC_IDLE) state and/or a radio resource control inactive (RRC_INAC-TIVE) state, such as, by way of example and not of limitation, a first parameter that configures a cell-reselection procedure, a second parameter that configures reception of broadcast information, a third parameter that configures reception of paging, and/or a four parameter that configures sidelink operation. Alternatively or additionally, the configuration indication may indicate one or more indices, where each index maps to a respective entry of a table of connection configurations.

The source network node 606 may transmit the configuration indication in a broadcast message. To illustrate, the source network node 606 may transmit the configuration indication in an SIB. In some aspects, the source network node 606 may transmit the configuration indication in a multicast message (e.g., a message to a specific group of UEs). Alternatively or additionally, the source network node 606 may transmit the configuration indication in a unicast message (e.g., a first unicast message to the first UE 602 and/or a second unicast message to the second UE 604).

In some aspects, the source network node 606 may transmit and/or indicate, by way of one or more configuration indications, multiple sets of connection configurations. For instance, the source network node 606 may transmit a first configuration indication that is associated with a first set of RRC idle state connection configurations. That is, the first set of connection configurations may be associated with a UE operating in an RRC idle state and/or the UE may be instructed to only use the first set of connection configurations while operating in the RRC idle state. Alternatively or additionally, the source network node 606 may transmit a second configuration indication that is associated with a second set of RRC inactive state connection configurations (e.g., associated with a UE operating in an RRC inactive state) and/or a third configuration indication that is associated with a third set of RRC active state connection configurations (e.g., associated with a UE operating in an RRC active state). The source network node 606 may indicate that a same set of connection configurations may be associated with both the RRC idle state and the RRC inactive state.

In some aspects, the source network node 606 may transmit and/or indicate, by way of one or more configuration indications, multiple sets of connection configurations. For instance, the source network node 606 may transmit three sets of connection configurations, and each set may be associated with a different RRC state. To illustrate, each connection configuration in a first set of connection configurations may be associated with an RRC_IDLE state, each connection configuration in a second set of connection configurations may be associated with an RRC_INACTIVE state, and/or each connection configuration in a third set of connection configurations may be associated with a radio resource control connected (RRC_CONNECTED) state. Alternatively or additionally, the source network node 606 may transmit a set of switch events, and each switch event may be associated with switching to a particular set of connection configurations (e.g., a first switch event may be associated with switching to a first set of connection configurations associated with an RRC_IDLE state and/or a second switch event may be associated with switching to a second set of connection configurations associated with an RRC_CONNECTED state). The source network node 606 may indicate that a set of connection configurations is associated with a single RRC state or multiple RRC states. Alternatively or additionally, the source network node 606 may indicate that a subset of connection configurations within a set is associated with one or more sets of connections configurations (e.g., the subset of connection configurations may be associated with a first set of (RRC_IDLE) connection configurations and a second set of (RRC_CONNECTED) connection configurations).

The source network node 606 may indicate, based at least in part on using one or more configuration indications, a first set of common connection configurations that may be used by multiple UEs (e.g., common to each UE) and a second set of delta connection configurations (e.g., directed to a single UE and/or common to multiple UEs). To illustrate, the source network node 606 may transmit a first configuration indication associated with the first set of common connection configurations in a first SIB and a second configuration indication associated with the second set of delta connection configurations in a second SIB. In some aspects, a delta connection configuration indicates a difference that is relative to a connection parameter included in a common connection configuration. That is, each delta connection parameter included in a delta connection configuration may indicate a respective difference to combine with a common connection parameter included in a common connection configuration. In some aspects, a delta connection configuration indicates one or multiple configuration changes (e.g., an addition or a subtraction) to one or more common connection parameters included in a common connection configuration.

As shown by reference number 620-1 and by reference number 620-2, the first UE 602 and/or the second UE 604, respectively, may store one or more sets of connection configuration (e.g., indicated by the source network node 606). For instance, the first UE 602 may store one or more sets of connection configurations (e.g., a first set of RRC idle state connection configurations, a second set of RRC active state connection configurations, a third set of common connection configurations, and/or a fourth set of delta connection configurations) in a local memory device of the first UE 602. Alternatively or additionally, the second UE 604 may store the one or more sets of connection configurations in a local memory device of the second UE 604. Storing the one or more sets of connection configurations may include storing one or more connection identifiers associated with set(s) of connection configurations.

As shown by reference number 625-1, the first UE 602 may detect a switch event associated with an m-th connection configuration included in one of the sets of connection configurations stored by the first UE 602, where m is an integer. Alternatively or additionally, and as shown by reference number 625-2, the second UE 604 may detect a switch event associated with an n-th connection configuration included in one of the sets of connection configurations stored by the second UE 604, where n is an integer. To illustrate, and as described above, the first UE 602 and/or the second UE 604 may detect a respective switch event based at least in part on any combination of a signal metric, a current satellite location (e.g., associated with the source network node 606), current satellite ephemeris, a current elevation angle, a current UE location, a current time, and/or a current connection identifier. In some aspects, the switch event may be associated with an RRC idle state connection configuration, an RRC inactive state connection configuration, and/or an RRC connected state connection configuration. Alternatively or additionally, the switch event may be associated with a common connection configuration and/or a delta connection configuration.

In some aspects, the first UE 602 and/or the second UE 604 may determine whether to use a common connection configuration from a set of common connection configurations in combination with a delta connection configuration from a set of delta connection configurations. As one example, a common connection configuration and/or a set of common connection configurations may be associated with a time duration. That is, the source network node 606 may indicate the time duration as part of the configuration indication. The first UE 602 and/or the second UE 604 may determine whether to use a common connection configuration (e.g., from the set) based at least in part on an expiration time and/or validity duration associated with the common connection configuration. For instance, the first UE 602 may determine that an expiration time has not occurred, and determine to use the common connection configuration for communicating in the NTN. In some aspects, if a connection configuration has expired, the UE may use another set of connection configurations that has become valid (e.g., next in time based at least in part on an associated validity duration). Alternatively or additionally, the first UE 602 may determine to use the common connection configuration in combination with a delta connection configuration.

While the example 600 shows the first UE 602 and the second UE 604 detecting switch events that are associated with different connection configurations, other examples may include the first UE 602 and the second UE 604 each detecting a switch event associated with a same connection configuration. Alternatively or additionally, in other examples, only one of the first UE 602 and the second UE 604 may detect a switch event.

As shown by reference number 630-1, the first UE 602 may transmit, and the source network node 606 may receive, a switch indication that indicates the first UE 602 is autonomously applying and/or switching to the m-th connection configuration. Alternatively or additionally, and as shown by reference number 630-2, the second UE 604 may transmit, and the source network node 606 may receive, a switch indication that indicates the second UE 604 is autonomously applying and/or switching to the n-th connection configuration. As described above, the first UE 602 and/or the second UE 604 may transmit a respective switch indication in at least one of an RRC message, uplink control information, and/or a MAC CE. Each switch indication may specify and/or indicate a connection identifier associated with a selected connection configuration. While the example 600 shows the first UE 602 and the second UE 604 transmitting a respective switch indication to a same network node (e.g., the source network node 606), other examples may include the first UE 602 and the second UE 604 transmitting a respective switch indication to different network nodes. In some examples, the first UE 602 and/or the second UE 604 may refrain from transmitting the switch indication. As described above, the source network node may transmit a switch indication response or refrain from transmitting the switch indication response to the first UE 602 and/or the second UE 604.

As shown by reference number 635-1, the first UE 602 and the source network node 606 may communicate with one another based at least in part on using the m-th connection configuration. Alternatively or additionally, and as shown by reference number 635-2, the second UE 604 and the source network node 606 may communicate with one another based at least in part on using the n-th connection configuration. For instance, and as described above, the first UE 602 may communicate with the source network node 606 by configuring an antenna, a transmitter, and/or a receiver based at least in part on the m-th connection configuration. Similarly, the second UE 604 may communicate with the source network node 606 by configuring an antenna, a transmitter, and/or a receiver based at least in part on the n-th connection configuration.

While the example 600 shows the first UE 602 and the second UE 604 communicating with a same network node (e.g., the source network node 606), other examples may include the first UE 602 and the second UE 604 communicating with different network nodes. As shown by FIG. 6A, the example 600 proceeds to FIG. 6B.

As shown by reference number 640-1 of FIG. 6B, the first UE 602 may detect a switch event that is associated with a j-th connection configuration of a locally stored set of connection configurations, where j is an integer. Alternatively or additionally, and as shown by reference number 640-2 of FIG. 6B, the second UE 604 may detect a switch event that is associated with a k-th connection configuration of a locally stored set of connection configurations, where k is an integer. In other examples, only one of the first UE 602 and the second UE 604 may detect the respective switch event as shown by reference number 604-1 and reference number 604-2. Further, while the example 600 shows the first UE 602 and the second UE 604 detecting switch events that are associated with different connection configurations, other examples may include the first UE 602 and the second UE 604 each detecting a switch event associated with a same connection configuration. Examples of a switch event may be based at least in part on any combination of a signal metric, a current satellite location, current satellite ephemeris, a current elevation angle, a current UE location, a current time, and/or a current connection identifier.

As shown by reference number 645-1, the first UE 602 may transmit, and a target network node 608 may receive, a switch indication that indicates the first UE 602 is autonomously applying and/or switching to the j-th connection configuration. Alternatively or additionally, and as shown by reference number 645-2, the second UE 604 may transmit, and the target network node 608 may receive, a switch indication that indicates the second UE 604 is autonomously applying and/or switching to the k-th connection configuration. In some aspects, the first UE 602 and/or the second UE 604 may transmit the switch indication to the target network node 608 based at least in part on performing a handover to the target network node 608 as described above. While the example 600 shows the first UE 602 and the second UE 604 transmitting a respective switch indication to a same network node (e.g., the target network node 608), other examples may include the first UE 602 and the second UE 604 transmitting a respective switch indication to different network nodes. To illustrate, the second UE 604 may transmit a respective switch indication to the source network node 606 (e.g., instead of the target network node 608) based at least in part on not performing a handover to the target network node 608.

As shown by reference number 650-1, the first UE 602 and the target network node 608 may communicate with one another based at least in part on using the j-th connection configuration. Alternatively or additionally, and as shown by reference number 650-2, the second UE 604 and the target network node 608 may communicate with one another based at least in part on using the k-th connection configuration. As described above, the first UE 602 and/or the second UE 604 may use a respective connection configuration that is stored local to the UE to preserve air interface resources instead of receiving an additional transmission (e.g., an RRC message) that includes the one or more parameters of the connection configuration.

A network node indicating a set of connection configurations, and a UE storing the set of connection configurations locally, may reduce signaling overhead in an NTN and mitigate redundant transmissions. Reducing the signaling overhead preserves air interface resources for other communications in the NTN, increases a capacity of the NTN, reduces data transfer latencies in the NTN, and/or increases data throughput in the NTN.

As indicated above, FIGS. 6A and 6B are provided as an example. Other examples may differ from what is described with regard to FIGS. 6A and 6B.

FIG. 7 is a diagram illustrating an example process 700 performed, for example, by a UE, in accordance with the present disclosure. Example process 700 is an example where the UE (e.g., UE 120) performs operations associated with efficient configuration of a non-terrestrial network connection.

As shown in FIG. 7, in some aspects, process 700 may include communicating in a network based at least in part on using a first connection configuration (block 710). For example, the UE (e.g., using communication manager 140, reception component 902, and/or transmission component 904, depicted in FIG. 9) may communicate in a network based at least in part on using a first connection configuration, as described above.

As further shown in FIG. 7, in some aspects, process 700 may include communicating in the network based at least in part using a second connection configuration instead of the first connection configuration (block 720). For example, the UE (e.g., using communication manager 140, reception component 902, and/or transmission component 904, depicted in FIG. 9) may communicate in the network based at least in part using a second connection configuration instead of the first connection configuration, as described above.

As further shown in FIG. 7, in some aspects, process 700 may include autonomously switching to reusing the first connection configuration for communicating in the network based at least in part on the first connection configuration being stored at the UE (block 730). For example, the UE (e.g., using communication manager 140 and/or connection configuration manager component 908, depicted in FIG. 8) may autonomously switch to reusing the first connection configuration for communicating in the network based at least in part on the first connection configuration being stored at the UE, as described above.

Process 700 may include additional aspects, such as any single aspect or any combination of aspects described below and/or in connection with one or more other processes described elsewhere herein.

In a first aspect, process 700 includes detecting a switch event that is associated with the first connection configuration, and autonomously switching is based at least in part on detecting the switch event.

In a second aspect, detecting the switch event includes at least one of detecting receipt of a configuration identifier associated with the first connection configuration, detecting receipt of a handover command, detecting that a signal metric satisfies a switch condition, detecting a current satellite location satisfies a satellite location condition, detecting that current satellite ephemeris is commensurate with satellite ephemeris associated with the first connection configuration, detecting that a current elevation angle associated with communicating with a satellite is commensurate with an elevation angle associated with the first connection configuration, detecting that a current UE location satisfies a UE location condition, detecting that a current time occurs within a configured time duration, or detecting that a current connection identifier is associated with the first connection configuration.

In a third aspect, the current connection identifier includes at least one of a beam identifier, a satellite identifier, or a cell identifier.

In a fourth aspect, process 700 includes transmitting a switch indication that is associated with autonomously switching to the first connection configuration.

In a fifth aspect, the switch indication specifies a configuration identifier associated with the first connection configuration.

In a sixth aspect, transmitting the switch indication includes transmitting the switch indication in at least one of uplink control information, a medium access control MAC CE, or an RRC message.

In a seventh aspect, process 700 includes receiving a switch indication response that indicates at least one of receipt of the switch indication, or acknowledgement of the switch indication.

In an eighth aspect, process 700 includes storing the first connection configuration at the UE.

In a ninth aspect, process 700 includes storing the second connection configuration at the UE.

In a tenth aspect, the network includes a non-terrestrial network.

In an eleventh aspect, process 700 includes receiving the first connection configuration or the second connection configuration based at least in part on at least one of a broadcast message, a unicast message, or a multicast message.

In a twelfth aspect, receiving the first connection configuration or the second connection configuration includes receiving one or more connection parameters associated with the first connection configuration or the second connection configuration in an RRC message.

In a thirteenth aspect, the RRC message includes an RRC reconfiguration message.

In a fourteenth aspect, process 700 includes receiving, with the first connection configuration, a configuration identifier.

In a fifteenth aspect, process 700 includes transmitting an indication of the configuration identifier based at least in part on autonomously switching to the first connection configuration.

In a sixteenth aspect, process 700 includes deriving a configuration identifier associated with the first connection configuration.

In a seventeenth aspect, process 700 includes communicating, based at least in part on autonomously switching to the first connection configuration, in the network based at least in part on using the first connection configuration.

In an eighteenth aspect, process 700 includes receiving the first connection configuration from a first network node in the network, communicating with the first network node in the network based at least in part on the first connection configuration, and communicating with a second network node in the network based at least in part on the first connection configuration being stored at the UE.

In a nineteenth aspect, process 700 includes receiving an additional connection configuration parameter, and using the additional connection configuration parameter with the first connection configuration to communicate in the network.

In a twentieth aspect, process 700 includes receiving an update indication to update at least one of the first connection configuration, or the second connection configuration, and updating at least one of the first connection configuration or the second connection configuration based at least in part on the update indication.

In a twenty-first aspect, process 700 includes receiving, prior to communicating using the second connection configuration and autonomously switching to the first connection configuration, a configuration indication that specifies a set of connection configurations that includes at least one of the first connection configuration, or the second connection configuration.

In a twenty-second aspect, receiving the configuration indication includes receiving the configuration indication in at least one of a broadcast message, or a multicast message.

In a twenty-third aspect, process 700 includes transmitting a request for the set of connection configurations, and receiving the configuration indication is based at least in part on transmitting the request.

In a twenty-fourth aspect, receiving the configuration indication includes receiving the configuration indication in a system information block.

In a twenty-fifth aspect, process 700 includes receiving a configuration indication that specifies a set of connection configurations that is associated with at least one of an RRC idle state, or an RRC inactive state.

In a twenty-sixth aspect, process 700 includes using a third connection configuration that is included in the set of connection configurations based at least in part on operating in the RRC idle state or the RRC inactive state.

In a twenty-seventh aspect, the configuration indication that specifies the set of connection configurations is a first configuration indication that specifies a first set of common connection configurations, and process 700 includes receiving the first configuration indication in a first SIB, and receiving a second configuration indication that specifies a second set of delta connection configurations in a second SIB.

In a twenty-eighth aspect, process 700 includes determining whether to use a common connection configuration from the first set of common connection configurations in combination with a delta connection configuration in the second set of delta connection configurations.

In a twenty-ninth aspect, determining whether to use the common connection configuration includes determining whether to use the common connection configuration based at least in part on an expiration time associated with the common connection configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with efficient configuration of a non-terrestrial network connection.

As shown in FIG. 8, in some aspects, process 800 may include transmitting at least one of a first connection configuration or a second connection configuration (block 810). For example, the network node (e.g., using communication manager 150 and/or transmission component 1004, depicted in FIG. 10) may transmit at least one of a first connection configuration or a second connection configuration, as described above.

As further shown in FIG. 8, in some aspects, process 800 may include communicating with a UE in a network based at least in part on using the first connection configuration (block 820). For example, the network node (e.g., using communication manager 150, reception component 1002, and/or transmission component 1004, depicted in FIG. 10) may communicate with a UE in a network based at least in part on using the first connection configuration, as described above.

As further shown in FIG. 8, in some aspects, process 800 may include communicating with the UE in the network based at least in part on using the second connection configuration (block 830). For example, the network node (e.g., using communication manager 150, reception component 1002, and/or transmission component 1004, depicted in FIG. 10) may communicate with the UE in the network based at least in part on using the second connection configuration, as described above.

As further shown in FIG. 8, in some aspects, process 800 may include communicating with the UE in the network based at least in part on reusing the first connection configuration and without an additional transmission of the first connection configuration (block 840). For example, the network node (e.g., using communication manager 150, reception component 1002, and/or transmission component 1004, depicted in FIG. 10) may communicate with the UE in the network based at least in part on reusing the first connection configuration and without an additional transmission of the first connection configuration, as described above.

Process 800 may include additional aspects, such as any single aspect or any combination of aspects described below and/or in connection with one or more other processes described elsewhere herein.

In a first aspect, process 800 includes receiving a switch indication that indicates the UE is using the first connection configuration, and communicating with the UE in the network based at least in part on reusing the first connection configuration is based at least in part on receiving the switch indication.

In a second aspect, process 800 includes transmitting a switch indication response that is based at least in part on receiving the switch indication.

In a third aspect, the switch indication specifies a configuration identifier associated with the first connection configuration.

In a fourth aspect, receiving the switch indication includes receiving the switch indication in at least one of uplink control information, a MAC CE, or an RRC message.

In a fifth aspect, transmitting at least one of the first connection configuration or the second connection configuration further includes transmitting a configuration indication that specifies at least one of the second connection configuration or the first connection configuration, and the transmitting is based at least in part on at least one of a broadcast message, a unicast message, or a multicast message.

In a sixth aspect, process 800 includes transmitting an additional connection configuration parameter that is additional to at least one of the second connection configuration or the first connection configuration.

In a seventh aspect, process 800 includes transmitting an update indication to update at least one of the second connection configuration, or the first connection configuration.

In an eighth aspect, transmitting at least one of the first connection configuration or the second connection configuration further includes transmitting, a configuration indication that specifies a set of connection configurations that includes at least one of the second connection configuration, or the first connection configuration.

In a ninth aspect, transmitting the configuration indication includes transmitting the configuration indication in at least one of a broadcast message, or a multicast message.

In a tenth aspect, process 800 includes receiving a request for the set of connection configurations, and transmitting the configuration indication is based at least in part on receiving the request.

In an eleventh aspect, transmitting the configuration indication includes transmitting the configuration indication in an SIB.

In a twelfth aspect, the configuration indication that specifies the set of connection configurations is a first configuration indication that specifies a first set of common connection configurations, the SIB is a first SIB, and process 800 includes transmitting a second configuration indication that specifies a second set of delta connection configurations in a second SIB.

In a thirteenth aspect, process 800 includes transmitting a configuration indication that specifies a set of connection configurations that is associated with at least one of an RRC idle state, or an RRC inactive state.

In a fourteenth aspect, the network includes a non-terrestrial network.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
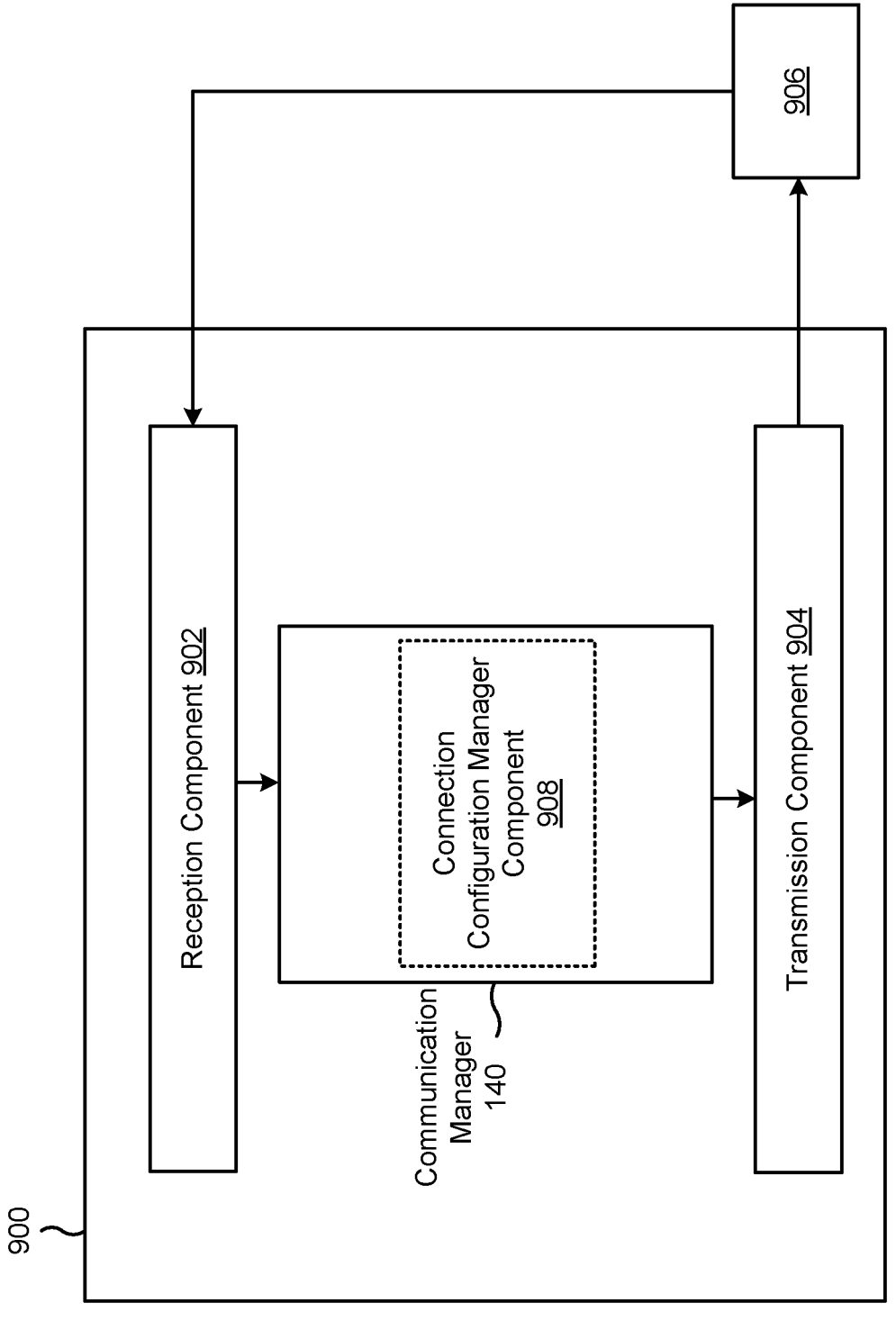
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a connection configuration manager component 908, among other examples.

In some aspects, the apparatus 900 may be configured to perform one or more operations described herein in connection with FIGS. 4A-8 Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The connection configuration manager 908 may communicate in a network based at least in part on using a first connection configuration. The connection configuration manager 908 may communicate in the network based at least in part using a second connection configuration instead of the first connection configuration. The connection configuration manager 908 may autonomously switch to reusing the first connection configuration for communicating in the network based at least in part on the first connection configuration being stored at the UE.

The connection configuration manager 908 may detect a switch event that is associated with the first connection configuration and autonomously switching is based at least in part on detecting the switch event. In some aspects, the connection configuration manager 908 may transmit, by way of the transmission component 904, a switch indication that is associated with autonomously switching to the first connection configuration. The connection configuration manager 908 may receive, by way of the reception component 902, a switch indication response that indicates at least one of receipt of the switch indication, or acknowledgement of the switch indication.

The connection configuration manager 908 may store the first connection configuration at the UE. Alternatively or additionally, the connection configuration manager 908 may store the second connection configuration at the UE. The connection configuration manager 908 may receive, by way of the reception component 902, the first connection configuration or the second connection configuration based at least in part on at least one of a broadcast message, a unicast message, or a multicast message.

The connection configuration manager 908 may receive, by way of the reception component 902 and with the first connection configuration, a configuration identifier. The connection configuration manager 908 may transmit, by way of the transmission component 904, an indication of the configuration identifier based at least in part on autonomously switching to the first connection configuration. In some aspects, the connection configuration manager 908 may derive a configuration identifier associated with the first connection configuration. The connection configuration manager 908 may communicate, based at least in part on autonomously switching to the first connection configuration, in the network based at least in part on using the first connection configuration.

The connection configuration manager 908 may receive, by way of the reception component 902, the first connection configuration from a first network node in the network. In some aspects, the connection configuration manager 908 may communicate with the first network node in the network based at least in part on the first connection configuration. The connection configuration manager 908 may communicate with a second network node in the network based at least in part on the first connection configuration being stored at the UE.

In some aspects, the connection configuration manager 908 may receive, by way of the reception component 902, an additional connection configuration parameter. The connection configuration manager 908 may use the additional connection configuration parameter with the first connection configuration to communicate in the network.

The connection configuration manager 908 may receive, by way of the reception component 902, an update indication to update at least one of the first connection configuration, or the second connection configuration. In some aspects, the connection configuration manager 908 may update at least one of the first connection configuration or the second connection configuration based at least in part on the update indication.

The connection configuration manager 908 may receive, by way of the reception component 902 prior to communicating using the second connection configuration and prior to autonomously switching to the first connection configuration, a configuration indication that specifies a set of connection configurations that includes at least one of the first connection configuration, or the second connection configuration. In some aspects, the connection configuration manager 908 may transmit, by way of the transmission component 904, a request for the set of connection configurations and receiving the configuration indication is based at least in part on transmitting the request. Alternatively or additionally, the connection configuration manager 908 may receive, by way of the reception component 902, a configuration indication that specifies a set of connection configurations that is associated with at least one of an RRC idle state, or an RRC inactive state. The connection configuration manager 908 may use a third connection configuration that is included in the set of connection configurations based at least in part on operating in the RRC idle state or the RRC inactive state.

The connection configuration manager 908 may determine whether to use a common connection configuration from the first set of common connection configurations in combination with a delta connection configuration in the second set of delta connection configurations.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
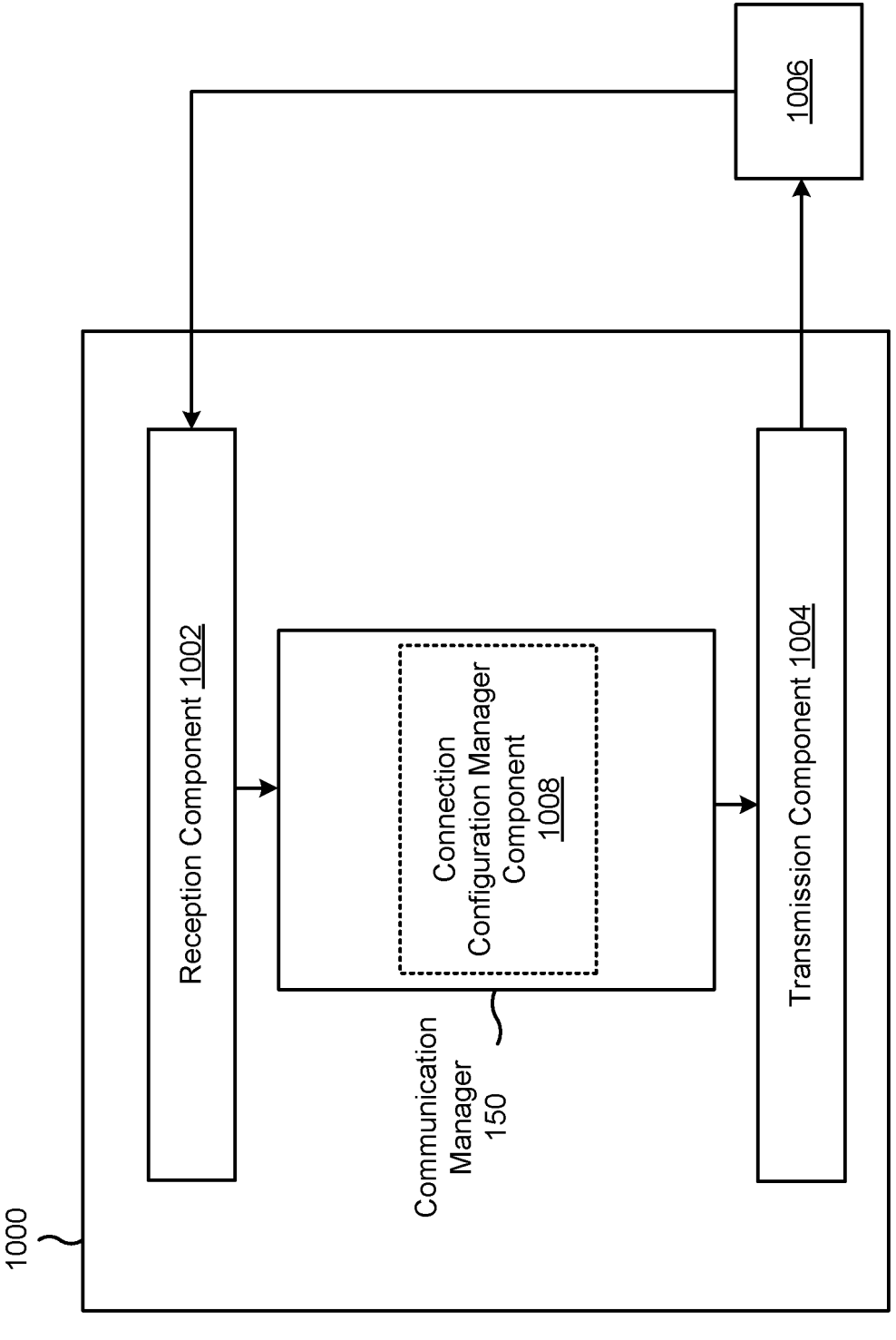
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a connection configuration manager 1008, among other examples.

In some aspects, the apparatus 1000 may be configured to perform one or more operations described herein in connection with FIGS. 4A-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The connection configuration manager component 1008 may transmit, by way of the transmission component 1004, at least one of a first connection configuration or a second connection configuration. The connection configuration manager component 1008 may communicate with a UE in a network based at least in part on using the first connection configuration. The connection configuration manager component 1008 may communicate with the UE in the network based at least in part on using the second connection configuration. The connection configuration manager component 1008 may communicate with the UE in the network based at least in part on reusing the first connection configuration and without an additional transmission of the first connection configuration.

The connection configuration manager component 1008 may receive, by way of the reception component 1002, a switch indication that indicates the UE is using the first connection configuration and communicating with the UE in the network based at least in part on reusing the first connection configuration is based at least in part on receiving the switch indication. The connection configuration manager component 1008 may transmit, by way of the transmission component 1004, a switch indication response that is based at least in part on receiving the switch indication.

The connection configuration manager component 1008 may transmit, by way of the transmission component 1004, an additional connection configuration parameter that is additional to at least one of the second connection configuration or the first connection configuration. Alternatively or additionally, the connection configuration manager component 1008 may transmit, by way of the transmission component 1004, an update indication to update at least one of the second connection configuration, or the first connection configuration.

The connection configuration manager component 1008 may receive, by way of the reception component 1002, a request for the set of connection configurations and transmitting the configuration indication is based at least in part on receiving the request. In some aspects, the connection configuration manager component 1008 may transmit, by way of the transmission component 1004, a configuration indication that specifies a set of connection configurations that is associated with at least one of an RRC idle state, or an RRC inactive state.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: communicating in a network based at least in part on using a first connection configuration; communicating in the network based at least in part using a second connection configuration instead of the first connection configuration; and autonomously switching to reusing the first connection configuration for communicating in the network based at least in part on the first connection configuration being stored at the UE.

Aspect 2: The method of Aspect 1, further comprising: detecting a switch event that is associated with the first connection configuration, wherein autonomously switching is based at least in part on detecting the switch event.

Aspect 3: The method of Aspect 2, wherein detecting the switch event comprises at least one of: detecting receipt of a configuration identifier associated with the first connection configuration, detecting receipt of a handover command, detecting that a signal metric satisfies a switch condition, detecting a current satellite location satisfies a satellite location condition, detecting that current satellite ephemeris is commensurate with satellite ephemeris associated with the first connection configuration, detecting that a current elevation angle associated with communicating with a satellite is commensurate with an elevation angle associated with the first connection configuration, detecting that a current UE location satisfies a UE location condition, detecting that a current time occurs within a configured time duration, or detecting that a current connection identifier is associated with the first connection configuration.

Aspect 4: The method of Aspect 3, wherein the current connection identifier comprises at least one of: a beam identifier, a satellite identifier, or a cell identifier.

Aspect 5: The method of any one of Aspects 2-4, further comprising: transmitting a switch indication that is associated with autonomously switching to the first connection configuration.

Aspect 6: The method of Aspect 5, wherein the switch indication specifies a configuration identifier associated with the first connection configuration.

Aspect 7: The method of Aspect 5 or Aspect 6, wherein transmitting the switch indication comprises: transmitting the switch indication in at least one of: uplink control information, a medium access control (MAC) control element (CE), or a radio resource control (RRC) message.

Aspect 8: The method of any one of Aspects 5-7, further comprising: receiving a switch indication response that indicates at least one of: receipt of the switch indication, or acknowledgement of the switch indication.

Aspect 9: The method of any of Aspects 1-8, further comprising: storing the first connection configuration at the UE.

Aspect 10: The method of any of Aspects 1-9, further comprising: storing the second connection configuration at the UE.

Aspect 11: The method of any of Aspects 1-10, wherein the network comprises a non-terrestrial network.

Aspect 12: The method of any of Aspects 1-11, further comprising: receiving the first connection configuration or the second connection configuration based at least in part on at least one of: a broadcast message, a unicast message, or a multicast message.

Aspect 13: The method of Aspect 12, wherein receiving the first connection configuration or the second connection configuration comprises: receiving one or more connection parameters associated with the first connection configuration or the second connection configuration in a radio resource control (RRC) message.

Aspect 14: The method of Aspect 13, wherein the RRC message comprises an RRC reconfiguration message.

Aspect 15: The method of Aspect 13 or Aspect 14, further comprising: receiving, with the first connection configuration, a configuration identifier.

Aspect 16: The method of any one of Aspects 13-15, further comprising: transmitting an indication of the configuration identifier based at least in part on autonomously switching to the first connection configuration.

Aspect 17: The method of any one of Aspects 13-16, further comprising: deriving a configuration identifier associated with the first connection configuration.

Aspect 18: The method of any of Aspects 1-17, further comprising: communicating, based at least in part on autonomously switching to the first connection configuration, in the network based at least in part on using the first connection configuration.

Aspect 19: The method of any of Aspects 1-18, further comprising: receiving the first connection configuration from a first network node in the network, communicating with the first network node in the network based at least in part on the first connection configuration, and communicating with a second network node in the network based at least in part on the first connection configuration being stored at the UE.

Aspect 20: The method of any of Aspects 1-19, further comprising: receiving an additional connection configuration parameter; and using the additional connection configuration parameter with the first connection configuration to communicate in the network.

Aspect 21: The method of any of Aspects 1-20, further comprising: receiving an update indication to update at least one of: the first connection configuration, or the second connection configuration, and updating at least one of the first connection configuration or the second connection configuration based at least in part on the update indication.

Aspect 22: The method of any of Aspects 1-21, further comprising: receiving, prior to communicating using the second connection configuration and autonomously switching to the first connection configuration, a configuration indication that specifies a set of connection configurations that comprises at least one of: the first connection configuration, or the second connection configuration.

Aspect 23: The method of Aspect 22, wherein receiving the configuration indication comprises: receiving the configuration indication in at least one of: a broadcast message, or a multicast message.

Aspect 24: The method of Aspect 23, further comprising: transmitting a request for the set of connection configurations, wherein receiving the configuration indication is based at least in part on transmitting the request.

Aspect 25: The method of any one of Aspects 22-24, wherein receiving the configuration indication comprises: receiving the configuration indication in a system information block.

Aspect 26: The method of any of Aspects 1-25, further comprising: receiving a configuration indication that specifies a set of connection configurations that is associated with at least one of: a radio resource control (RRC) idle state, or an RRC inactive state.

Aspect 27: The method of Aspect 26, further comprising: using a third connection configuration that is included in the set of connection configurations based at least in part on operating in the RRC idle state or the RRC inactive state.

Aspect 28: The method of Aspect 26 or Aspect 27, wherein the configuration indication that specifies the set of connection configurations is a first configuration indication that specifies a first set of common connection configurations, and the method further comprises: receiving the first configuration indication in a first system information block (SIB), and receiving a second configuration indication that specifies a second set of delta connection configurations in a second SIB.

Aspect 29: The method of Aspect 28, further comprising: determining whether to use a common connection configuration from the first set of common connection configurations in combination with a delta connection configuration in the second set of delta connection configurations.

Aspect 30: The method of Aspect 29, wherein determining whether to use the common connection configuration comprises: determining whether to use the common connection configuration based at least in part on an expiration time associated with the common connection configuration.

Aspect 31: A method of wireless communication performed by a network node, comprising: transmitting at least one of a first connection configuration or a second connection configuration; communicating with a user equipment (UE) in a network based at least in part on using the first connection configuration; communicating with the UE in the network based at least in part on using the second connection configuration; and communicating with the UE in the network based at least in part on reusing the first connection configuration and without an additional transmission of the first connection configuration.

Aspect 32: The method of Aspect 31, further comprising: receiving a switch indication that indicates the UE is using the first connection configuration, wherein communicating with the UE in the network based at least in part on reusing the first connection configuration is based at least in part on receiving the switch indication.

Aspect 33: The method of Aspect 32 further comprising: transmitting a switch indication response that is based at least in part on receiving the switch indication.

Aspect 34: The method of Aspect 32 or Aspect 33, wherein the switch indication specifies a configuration identifier associated with the first connection configuration.

Aspect 35: The method of any one of Aspects 32-34, wherein receiving the switch indication comprises: receiving the switch indication in at least one of: uplink control information, a medium access control (MAC) control element (CE), or a radio resource control (RRC) message.

Aspect 36: The method of any of Aspects 31-35, wherein transmitting at least one of the first connection configuration or the second connection configuration further comprises:

transmitting a configuration indication that specifies at least one of the second connection configuration or the first connection configuration, wherein the transmitting is based at least in part on at least one of: a broadcast message, a unicast message, or a multicast message.

Aspect 37: The method of any of Aspects 31-36, further comprising: transmitting an additional connection configuration parameter that is additional to at least one of the second connection configuration or the first connection configuration.

Aspect 38: The method of any of Aspects 31-37, further comprising: transmitting an update indication to update at least one of: the second connection configuration, or the first connection configuration.

Aspect 39: The method of any of Aspects 31-38, wherein transmitting at least one of the first connection configuration or the second connection configuration further comprises: transmitting, a configuration indication that specifies a set of connection configurations that comprises at least one of: the second connection configuration, or the first connection configuration.

Aspect 40: The method of Aspect 39, wherein transmitting the configuration indication comprises: transmitting the configuration indication in at least one of: a broadcast message, or a multicast message.

Aspect 41: The method of Aspect 39 or Aspect 40, further comprising: receiving a request for the set of connection configurations, wherein transmitting the configuration indication is based at least in part on receiving the request.

Aspect 42: The method of any one of Aspects 39-41, wherein transmitting the configuration indication comprises: transmitting the configuration indication in a system information block (SIB).

Aspect 43: The method of Aspect 42, wherein the configuration indication that specifies the set of connection configurations is a first configuration indication that specifies a first set of common connection configurations, the SIB is a first SIB, and wherein the method further comprises: transmitting a second configuration indication that specifies a second set of delta connection configurations in a second SIB.

Aspect 44: The method of any of Aspects 31-43, further comprising: transmitting a configuration indication that specifies a set of connection configurations that is associated with at least one of: a radio resource control (RRC) idle state, or an RRC inactive state.

Aspect 45: The method of any of Aspects 31-44, wherein the network comprises a non-terrestrial network.

Aspect 46: An apparatus for wireless communication at a device, comprising a processor; memory coupled with the processor; and instructions stored in the memory and executable by the processor to cause the apparatus to perform the method of one or more of Aspects 1-30.

Aspect 47: An apparatus for wireless communication at a device, comprising a processor; memory coupled with the processor; and instructions stored in the memory and executable by the processor to cause the apparatus to perform the method of one or more of Aspects 31-45.

Aspect 48: A device for wireless communication, comprising a memory and one or more processors coupled to the memory, the one or more processors configured to perform the method of one or more of Aspects 1-30.

Aspect 49: A device for wireless communication, comprising a memory and one or more processors coupled to the memory, the one or more processors configured to perform the method of one or more of Aspects 31-45.

Aspect 50: An apparatus for wireless communication, comprising at least one means for performing the method of one or more of Aspects 1-30.

Aspect 51: An apparatus for wireless communication, comprising at least one means for performing the method of one or more of Aspects 31-45.

Aspect 52: A non-transitory computer-readable medium storing code for wireless communication, the code comprising instructions executable by a processor to perform the method of one or more of Aspects 1-30.

Aspect 53: A non-transitory computer-readable medium storing code for wireless communication, the code comprising instructions executable by a processor to perform the method of one or more of Aspects 31-45.

Aspect 54: A non-transitory computer-readable medium storing a set of instructions for wireless communication, the set of instructions comprising one or more instructions that, when executed by one or more processors of a device, cause the device to perform the method of one or more of Aspects 1-30.

Aspect 55: A non-transitory computer-readable medium storing a set of instructions for wireless communication, the set of instructions comprising one or more instructions that, when executed by one or more processors of a device, cause the device to perform the method of one or more of Aspects 31-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
communicate in a network based at least in part on using a first connection configuration that is based at least in part on a first beam configuration;
communicate in the network based at least in part using a second connection configuration instead of the first connection configuration, wherein the second connection configuration is based at least in part on a second beam configuration;
detect, as a switch event, that a satellite location associated with a target network node satisfies a satellite location condition associated with the first connection configuration; and
autonomously switch from using the second connection configuration stored locally at the UE to reusing the first connection configuration stored locally at the UE for communicating with the target network node in the network based at least in part on the first connection configuration being stored at the UE and based at least in part on detection of the switch event.

2. The apparatus of claim 1, wherein the one or more processors, to detect the switch event, are configured to:
detect receipt of a configuration identifier associated with the first connection configuration,
detect receipt of a handover command,
detect that a signal metric satisfies a switch condition,
detect that current satellite ephemeris is commensurate with satellite ephemeris associated with the first connection configuration,
detect that a current elevation angle associated with communicating with a satellite is commensurate with an elevation angle associated with the first connection configuration, detect that a current UE location satisfies a UE location condition,
detect that a current time occurs within a configured time duration, or
detect that a current connection identifier is associated with the first connection configuration.

3. The apparatus of claim 1, wherein the one or more processors are further configured to:
transmit a switch indication that is associated with autonomously switching to the first connection configuration.

4. The apparatus of claim 3, wherein the switch indication specifies a configuration identifier associated with the first connection configuration.

5. The apparatus of claim 3, wherein the one or more processors, to transmit the switch indication, are configured to:
transmit the switch indication in at least one of:
uplink control information,
a medium access control (MAC) control element (CE), or
a radio resource control (RRC) message.

6. The apparatus of claim 1, wherein the one or more processors are further configured to:
store the first connection configuration at the UE.

7. The apparatus of claim 1, wherein the network comprises a non-terrestrial network.

8. The apparatus of claim 1, wherein the one or more processors are further configured to:
receive the first connection configuration or the second connection configuration based at least in part on at least one of:
a broadcast message,
a unicast message, or
a multicast message.

9. The apparatus of claim 1, wherein the one or more processors are further configured to:
communicate, based at least in part on autonomously switching to the first connection configuration, in the network based at least in part on using the first connection configuration.

10. The apparatus of claim 1, wherein the one or more processors are further configured to:
receive the first connection configuration from a first network node in the network,
communicate with the first network node in the network based at least in part on the first connection configuration, and
communicate with a second network node in the network based at least in part on the first connection configuration being stored at the UE.

11. The apparatus of claim 1, wherein the one or more processors are further configured to:
receive an update indication to update at least one of:
the first connection configuration, or
the second connection configuration, and
update at least one of the first connection configuration or the second connection configuration based at least in part on the update indication.

12. The apparatus of claim 1, wherein the one or more processors are further configured to:
receive, prior to communicating using the second connection configuration and autonomously switching to the first connection configuration, a configuration indication that specifies a set of connection configurations that comprises at least one of:
the first connection configuration, or
the second connection configuration.

13. The apparatus of claim 12, wherein the one or more processors, to receive the configuration indication, are configured to:

receive the configuration indication in at least one of:
a broadcast message, or
a multicast message.

14. The apparatus of claim 12, wherein the one or more processors, to receive the configuration indication, are configured to:

receive the configuration indication in a system information block.

15. An apparatus for wireless communication at a network node, comprising:

one or more memories; and
one or more processors, coupled to the one or more memories, configured to:
transmit at least one of a first connection configuration that is based on a first beam configuration or a second connection configuration that is based on a second beam configuration;
communicate with a user equipment (UE) in a network based at least in part on using the first connection configuration;
communicate with the UE in the network based at least in part on using the second connection configuration; and
communicate with the UE in the network based at least in part on a switch from using the second connection configuration to reusing the first connection configuration and without an additional transmission of the first connection configuration, wherein the switch is based at least in part on a satellite location associated with the network node satisfying a satellite location condition associated with the first connection configuration.

16. The apparatus of claim 15, wherein the one or more processors are further configured to:

receive a switch indication that indicates the UE is using the first connection configuration, wherein communicating with the UE in the network based at least in part on reusing the first connection configuration is based at least in part on receiving the switch indication.

17. The apparatus of claim 16, wherein the one or more processors, to receive the switch indication, are configured to:

receive the switch indication in at least one of:
uplink control information,
a medium access control (MAC) control element (CE), or
a radio resource control (RRC) message.

18. The apparatus of claim 15, wherein the one or more processors are further configured to:

transmit an additional connection configuration parameter that is additional to at least one of the second connection configuration or the first connection configuration.

19. The apparatus of claim 15, wherein the one or more processors, to transmit at least one of the first connection configuration or the second connection configuration, are configured to:

transmit a configuration indication that specifies a set of connection configurations that comprises at least one of:
the second connection configuration, or
the first connection configuration.

20. The apparatus of claim 19, wherein the one or more processors, to transmit the configuration indication, are configured to:

transmit the configuration indication in at least one of:
a broadcast message, or
a multicast message.

21. The apparatus of claim 19, wherein the one or more processors are further configured to:

receive a request for the set of connection configurations, wherein transmitting the configuration indication is based at least in part on receiving the request.

22. The apparatus of claim 19, wherein the one or more processors, to transmit the configuration indication, are configured to:

transmit the configuration indication in a system information block (SIB).

23. A method of wireless communication performed by a user equipment (UE), comprising:

communicating in a network based at least in part on using a first connection configuration that is based at least in part on a first beam configuration;
communicating in the network based at least in part using a second connection configuration instead of the first connection configuration wherein the second connection configuration is based at least in part on a second beam configuration;
detecting, as a switch event, that a satellite location associated with a target network node satisfies a satellite location condition associated with the first connection configuration; and
autonomously switching from using the second connection configuration stored locally at the UE to reusing the first connection configuration stored locally at the UE for communicating with the target network node in the network based at least in part on the first connection configuration being stored at the UE and based at least in part on detecting the switch event.

24. The method of claim 23, further comprising:

transmitting a switch indication that is associated with autonomously switching to the first connection configuration.

25. The method of claim 23, further comprising:

communicating, based at least in part on autonomously switching to the first connection configuration, in the network based at least in part on using the first connection configuration.

26. A method of wireless communication performed by a network node, comprising:

transmitting at least one of a first connection configuration that is based on a first beam configuration or a second connection configuration that is based on a second beam configuration;
communicating with a user equipment (UE) in a network based at least in part on using the first connection configuration;
communicating with the UE in the network based at least in part on using the second connection configuration; and
communicating with the UE in the network based at least in part on switching from using the second connection configuration to reusing the first connection configuration and without an additional transmission of the first connection configuration, wherein the switching is based at least in part on a satellite location associated with the network node satisfying a satellite location condition associated with the first connection configuration.

27. The method of claim 26 further comprising:

receiving a switch indication that indicates the UE is using the first connection configuration; and transmitting a switch indication response that is based at least in part on receiving the switch indication.

28. The method of claim 26, wherein transmitting at least one of the first connection configuration or the second connection configuration further comprises:

transmitting a configuration indication that specifies at least one of the second connection configuration or the first connection configuration, wherein the transmitting is based at least in part on at least one of:

a broadcast message, a unicast message, or a multicast message.

29. The method of claim 24, wherein the switch indication specifies a configuration identifier associated with the first connection configuration.

30. The method of claim 24, wherein transmitting he switch indication comprises:

transmitting the switch indication in at least one of:

uplink control information, a medium access control (MAC) control element (CE), or a radio resource control (RRC) message.

* * * * *